US009032503B2

(12) United States Patent
Mustafa

(10) Patent No.: US 9,032,503 B2
(45) Date of Patent: May 12, 2015

(54) DIVERSITY STRING BASED PATTERN MATCHING

(76) Inventor: Shakeel Mustafa, Fremont, CA (US)

(*) Notice: Subject to any disclaimer, the term of this patent is extended or adjusted under 35 U.S.C. 154(b) by 1773 days.

(21) Appl. No.: 12/183,722

(22) Filed: Jul. 31, 2008

(65) Prior Publication Data
US 2009/0293114 A1 Nov. 26, 2009

Related U.S. Application Data

(60) Provisional application No. 61/054,632, filed on May 20, 2008.

(51) Int. Cl.
G06F 21/00 (2013.01)
H04L 29/06 (2006.01)

(52) U.S. Cl.
CPC .................. H04L 63/0227 (2013.01)

(58) Field of Classification Search
USPC .......................................... 370/394
See application file for complete search history.

(56) References Cited

U.S. PATENT DOCUMENTS

| 4,450,520 | A  | * | 5/1984  | Hollaar et al. ............... 710/65 |
|-----------|----|---|---------|--------------------------------------|
| 5,386,482 | A  | * | 1/1995  | Basso et al. ................. 382/101 |
| 5,452,451 | A  | * | 9/1995  | Akizawa et al. ..................... 1/1 |
| 5,826,013 | A  | * | 10/1998 | Nachenberg .................... 726/22 |
| 5,920,705 | A  | * | 7/1999  | Lyon et al. .................... 709/240 |
| 6,567,832 | B1 | * | 5/2003  | Ono et al. ..................... 708/606 |
| 6,691,273 | B2 | * | 2/2004  | Wager et al. .................. 714/751 |
| 7,080,305 | B2 | * | 7/2006  | Welbon et al. ................ 714/752 |
| 7,130,981 | B1 | * | 10/2006 | Nachenberg .................. 711/170 |
| 7,134,143 | B2 | * | 11/2006 | Stellenberg et al. ............ 726/25 |
| 7,529,242 | B1 | * | 5/2009  | Lyle ............................. 370/392 |
| 7,954,151 | B1 | * | 5/2011  | Nisbet et al. .................... 726/22 |
| 2002/0095635 | A1 | * | 7/2002 | Wager et al. .................. 714/746 |
| 2003/0108043 | A1 | * | 6/2003 | Liao ............................. 370/392 |
| 2004/0151197 | A1 | * | 8/2004 | Hui ............................... 370/412 |
| 2005/0182841 | A1 | * | 8/2005 | Sharp ............................ 709/228 |
| 2006/0064755 | A1 | * | 3/2006 | Azadet et al. .................... 726/24 |
| 2006/0077979 | A1 | * | 4/2006 | Dubrovsky et al. ........... 370/394 |
| 2006/0200567 | A1 | * | 9/2006 | Cousins et al. ............... 709/227 |
| 2007/0047457 | A1 | * | 3/2007 | Harijono et al. ............... 370/250 |
| 2007/0192863 | A1 | * | 8/2007 | Kapoor et al. .................. 726/23 |
| 2009/0016353 | A1 | * | 1/2009 | Li et al. ...................... 370/395.3 |
| 2009/0049347 | A1 | * | 2/2009 | Shridhar et al. .............. 714/704 |

* cited by examiner

Primary Examiner — Andrew Goldberg

(57) ABSTRACT

Diversity string based pattern matching is disclosed. In one embodiment, a method for inspecting multiple data patterns in a data block includes scanning the data block for a diversity string of each data pattern, where the diversity string is a subset of the each data pattern. The method further includes comparing the each data pattern with a respective segment of the data block only if the diversity string is present in the data block, and forwarding flag data if the each data pattern matches with the respective segment of the data block.

19 Claims, 26 Drawing Sheets

DIVERSITY STRING BASED PATTERN MATCHING

RELATED APPLICATIONS

Benefit is claimed under 35 U.S.C §119(e) of any U.S. provisional application No. 61/054,632 entitled "system and method for executing pattern matching" on May 20, 2008, which is herein incorporated in its entirety by reference for all purposes.

FIELD OF TECHNOLOGY

This disclosure relates generally to communication systems, methods, and devices for packet inspection.

BACKGROUND

A deep packet inspection (DPI) is a form of computer network packet filtering that examines data and/or header part of a packet as it passes an inspection point. During the inspection, non-protocol compliance, viruses, spam, intrusions or predefined criteria may be perused to decide if the packet can pass or if it needs to be routed to a different destination. With the advancement in the networking industry, it has become increasingly necessary to find more economical ways for DPI solutions at ultra high speed.

There are several methods of the DPI, which include analyses by port, by string match, by numerical properties, and by behavior and heuristics. Among the methods, the analysis by string involves the search for a sequence of textual characters or numeric values within the contents of one or more packets. Since the method involves the comparison of data patterns to textual characters within the contents of the packet, it often takes long time to complete the task when the data patterns or the textual characters are many. Since the packets have to be processed with the arduous pattern matching routine, a delay in the flow of communication can result. This becomes even more problematic especially for ultra high speed communication systems.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

An embodiment described in the detailed description is directed to a method for inspecting multiple data patterns in a data block which comprises scanning the data block for a diversity string of a data pattern, where the diversity string is a subset of the data pattern and is based on one or more data byte positions which best differentiate the plurality of data patterns from each other. The method further includes comparing the data pattern with a respective segment of the data block only if the diversity string is present in the data block, and forwarding flag data if the data pattern matches with the respective segment of the data block.

Another embodiment described in the detailed description is directed to a method for storing multiple data patterns in a memory which comprises forming a respective diversity string for each data pattern, wherein the respective diversity string comprises one or more data bytes and a position of each data byte in the diversity string is selected such that respective diversity strings of the data patterns differentiate the data patterns better than any other combination of data bytes in the each one of the data patterns based on a same number of data bytes as the diversity string. The method further includes storing the diversity string in a fast memory, and storing the each data pattern in a shared memory.

Yet another embodiment described in the detailed description is directed to a method for inspecting multiple data patterns in a data stream of multiple flows which comprises identifying a flow of each data packet, forming a data block by combining multiple data packets sharing a same flow, and scanning the data block for a diversity string of each one of the multiple data patterns, where the diversity string is a subset of each data pattern. The method further includes comparing the each data pattern with a respective segment of the data block only if the diversity string is present in the data block, and forwarding flag data if the each data pattern matches with the respective segment of the data block.

Moreover, another embodiment described in the detailed description is directed to a method for inspecting a set of data patterns in a data block, which comprises scanning the data block for respective diversity strings of the set of data patterns, where each one of the diversity strings is a subset of a respective one of the set of data patterns. The method further comprises comparing the set of data patterns with their respective segments of the data block only if the diversity strings are present in the data block, and forwarding flag data only if the set of data patterns matches with their respective segments of the data block.

As will be illustrated in the detailed description, other embodiments pertain to methods, systems, and devices that improve the efficiency of deep packet inspection. By comparing only relevant members of data patterns to data block rather than blindly comparing all the data patterns to the data block, the processing speed of deep packet inspection can be improved in many folds. This can be achieved first by comparing respective diversity stings of the data patterns to the data block, where each of the diversity strings is a subset of its respective data pattern and is based on one or more data byte positions which best differentiate the data patterns from each other. Then, the relevant members of the data patterns are compared with their respective segments of the data block, where the relevant members of the data patterns have their diversity strings present in the data block. As a result, it would take less time to complete the deep packet inspection of the data block by performing most of the inspection using the diversity strings than the blind matching of the entire data patterns to the data block.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Briefly stated, embodiments pertain to methods, systems, and devices that improve the efficiency of deep packet inspection. By comparing only relevant members of data patterns to data block rather than blindly comparing all the data patterns to the data block, the processing speed of deep packet inspection can be improved in many folds. This can be achieved first by comparing respective diversity stings of the data patterns to the data block, where each of the diversity strings is a subset of its respective data pattern and is based on one or more data byte positions which best differentiate the data patterns from each other. Then, the relevant members of the data patterns are compared with their respective segments of the data block, where the relevant members of the data patterns have their diversity strings present in the data block. As a result, it would take less time to complete the deep packet inspection of the data block by performing most of the inspection using the diversity strings than the blind matching of the entire data patterns to the data block.

Figure 1:
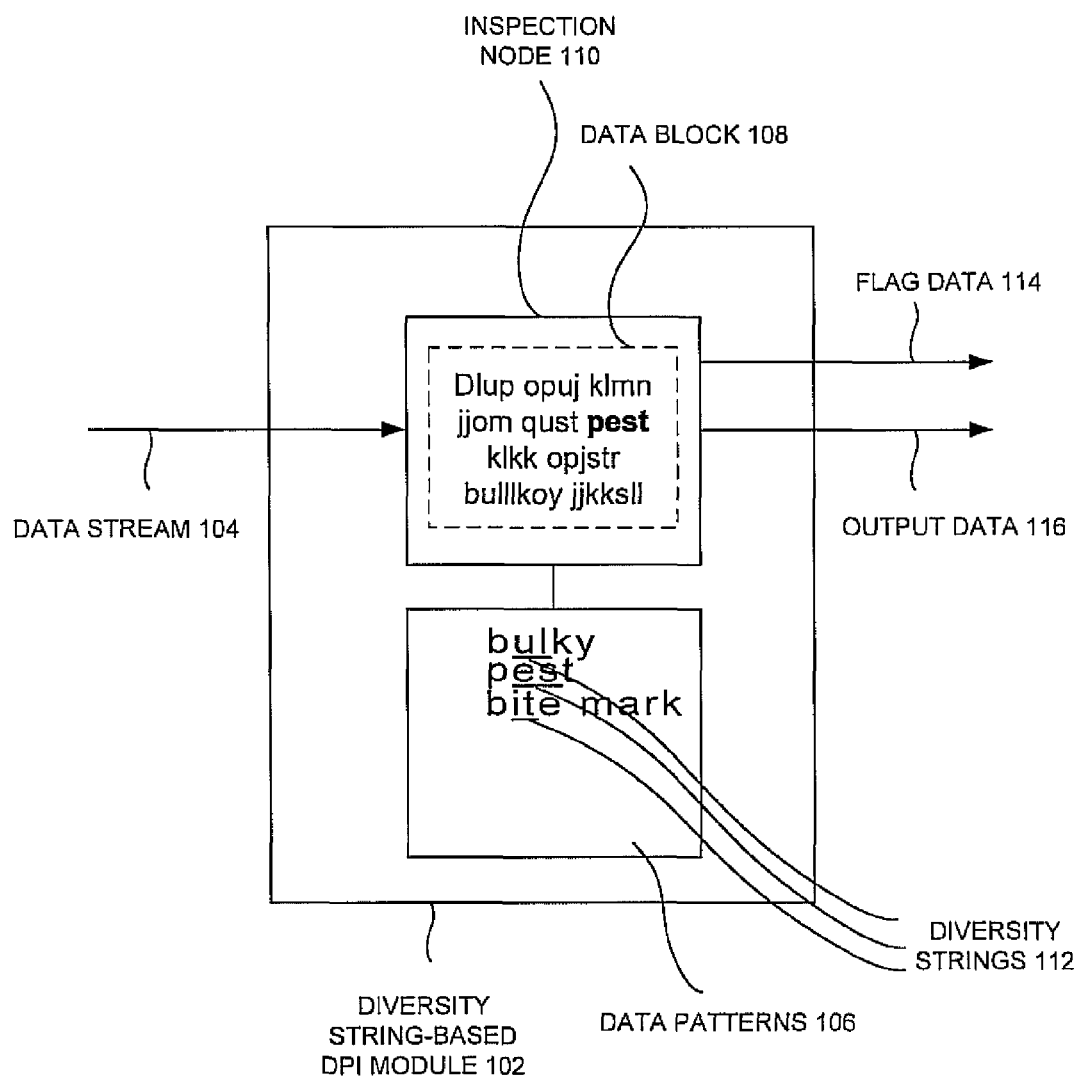
FIG. 1 is a block diagram of a diversity string-based deep pattern inspection (DPI) module, according to one embodiment.

FIG. 1 is a block diagram of a diversity string-based deep pattern inspection (DPI) module 102, according to one embodiment. In FIG. 1, a data stream 104 is processed in the diversity string-based DPI module 102 for data patterns 106. More particularly, a data block 108 may be inspected at an inspection node 110 based on a method which includes scanning the data block 108 for diversity strings 112 of the data patterns 106, where each diversity string (e.g., of one or more bytes) is a subset of its respective data pattern. In one embodiment, a position of one or more data bytes of each diversity string is selected such that the diversity strings 112 across the data patterns 106 provide more diversity among the data patterns than any other combination of data bytes in each data pattern made of a same number of data bytes for each string. As illustrated in FIG. 1, the diversity strings 112 which include "ul", "es", and "it" provide more diversity among the three provided patterns than any other combination of data bytes.

The method further includes comparing a data pattern with a respective segment of the data block 108 only if the diversity string associated with the data pattern is present in the data block 108. For example, the diversity strings "ul", "es", and "it" are compared with a respective string of the data block 108 which includes the second and third positions of the data block 108 starting from "D." Thus, "lu" is compared with the three diversity strings 112. Since no matching pattern is found, a next respective segment which includes the second and third data bytes starting from a byte next to "D" is compared with the diversity strings. That is, "up" is compared with the diversity strings 112. This continues until "ll" is compared with the diversity strings 112.

When any of the respective segments of the data block 108 matches with a diversity string, a segment of the data block 108 which corresponds to the data pattern which includes the diversity string is compared with the data pattern. For example, since "es" of the data block "108 matches with "es" of the diversity strings 112, the 4 byte long data segment "pest" is compared with the pattern "pest", resulting in a match. It is appreciated that the diversity string-based DPI is more efficient that a conventional method of comparing the data block 108 with the data patterns 106. For example, it would be much more time consuming to blindly compare the data block 108 with the data patterns 106 having a different number of bytes since 4, 5, and 9 byte data patterns have to be compared with the data block 108. It gets a lot more complicated if there are more number of data patterns of different lengths.

If a data pattern matches with its respective segment of the data block 108, flag data 114 may be forwarded. One or more segments of the data block 108 may be blocked from flowing via the inspection node if the flag data 114 indicates a matching of these segments with one or more of the data patterns 106. It is appreciated that the data block 108 may be one or more data packets. Alternatively, the data block 108 may be data stored in a storage device. Although examples in FIG. 1 are illustrated in terms of text data, it is appreciated that the data block 108 can be any combination of text, audio, video, image, and so on.

Figure 2:
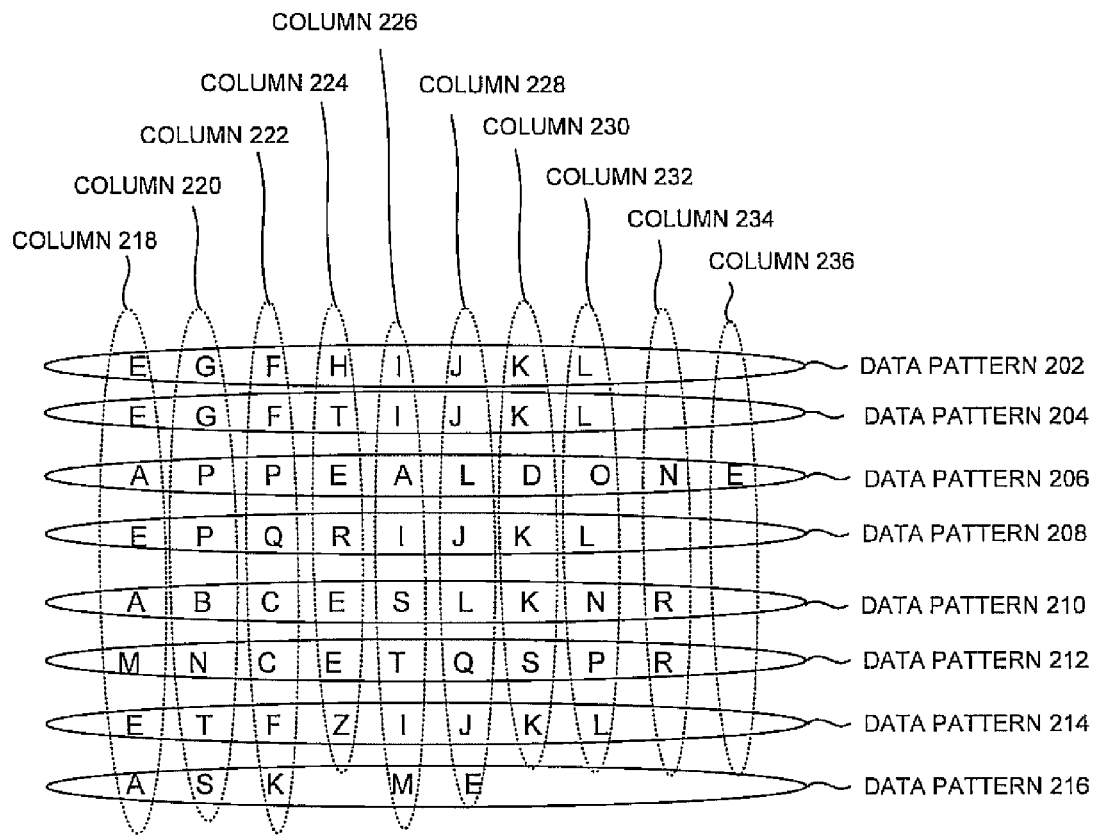
FIG. 2 illustrates exemplary data patterns, according to one embodiment.

FIG. 2 illustrates exemplary data patterns, according to one embodiment. The data patterns are of variable byte lengths where each ASCII character (e.g., number, alphabet, etc.) represents a byte. As illustrated in FIG. 2, a data pattern 202 of "EGFHIJKL" is formed of 8 bytes as are a data pattern 204, a data pattern 208, and a data pattern 214. A data pattern 206 is formed of 10 bytes, a data pattern 210 and a data pattern 212 are formed of 9 bytes, and a data pattern 216 is formed of 6 bytes including the space between "ASK" and "ME".

In order to determine respective byte positions in each data pattern which form diversity strings (e.g., the diversity string 112 of FIG. 1), the data patterns are aligned based on the first byte of each data pattern. Each of Columns (218 through 236) includes data bytes in that particular position for the data patterns starting from the first byte. For example, the column 218 includes "E" from the data pattern 202, "E" from the data pattern 204, "A" from the data pattern 206, "E" from the data pattern 208, "A" from the data pattern 210, "M" from the data pattern 212, "E" from the data pattern 214, and "A" from the data pattern 216. Thus, the column 218, which includes the first bytes of the data patterns, has 4 different data bytes. Likewise, the column 220 has 6 different data bytes, the column 222 5 different data bytes, the column 224 6 different data bytes, the column 226 5 different data bytes, the column 228 5 different data bytes, the column 230 4 different data bytes, the column 232 5 different data bytes, the column 234 3 different data bytes, and the column 236 2 different data bytes. The column 224, the column 230, and the column 232 count the blank space as a unique byte as the blank space is one of the ASCII characters.

Based on the byte counts, the byte positions for the diversity strings can be decided. For example, in FIG. 2, the column 220, which is the second data byte position of each data pattern, and the column 224, which is the fourth data byte position of each data pattern, can be good candidates to form the data strings. It is appreciated that creating the data strings by combining data bytes from the two most diverse byte positions across the data patterns may be more diverse than using a single data byte position. For example, the diversity strings based on the combination of the column 220 and the column 224 provide 8 different data strings, and they differentiate the data patterns better than the data bytes of column 220 with 6 different data bytes or the data bytes of column 224 with 6 different data bytes. Thus, by comparing target data (e.g., data stream, data block, data string, etc.) using the diversity strings, which are shorter than the entire data patterns, the deep pattern inspection or matching becomes more efficient.

Figure 3:
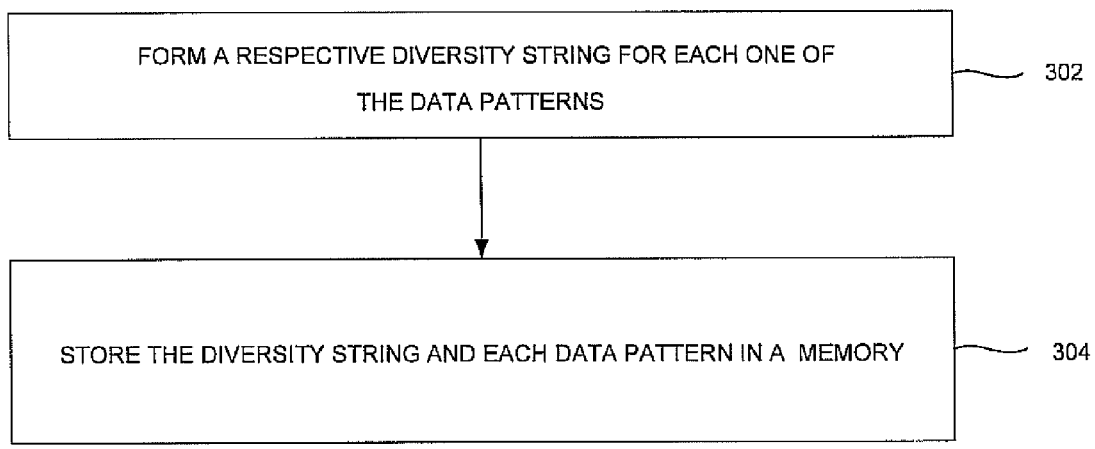
FIG. 3 is a process flow chart of an exemplary method for storing multiple data patterns in a memory, according to one embodiment.

FIG. 3 is a process flow chart of an exemplary method for storing multiple data patterns in a memory, according to one embodiment. In operation 302, a diversity string having one or more data bytes is determined for each one of data patterns. The diversity string comprises one or more data bytes. Moreover, the positions of the data bytes are selected such that respective diversity strings of the data patterns differentiate the data patterns better than any other combination of data bytes in each one of the data patterns, where the data bytes for the alternative diversity strings are based on a same number of data bytes as the diversity string. In operation 304, the diversity string and the data pattern associated with the diversity string are stored in a memory (e.g., a fast memory, a shared memory, etc.). FIG. 4 through FIG. 12 will describe an exemplary implementation of storing diversity strings for respective data patterns.

Figure 4:
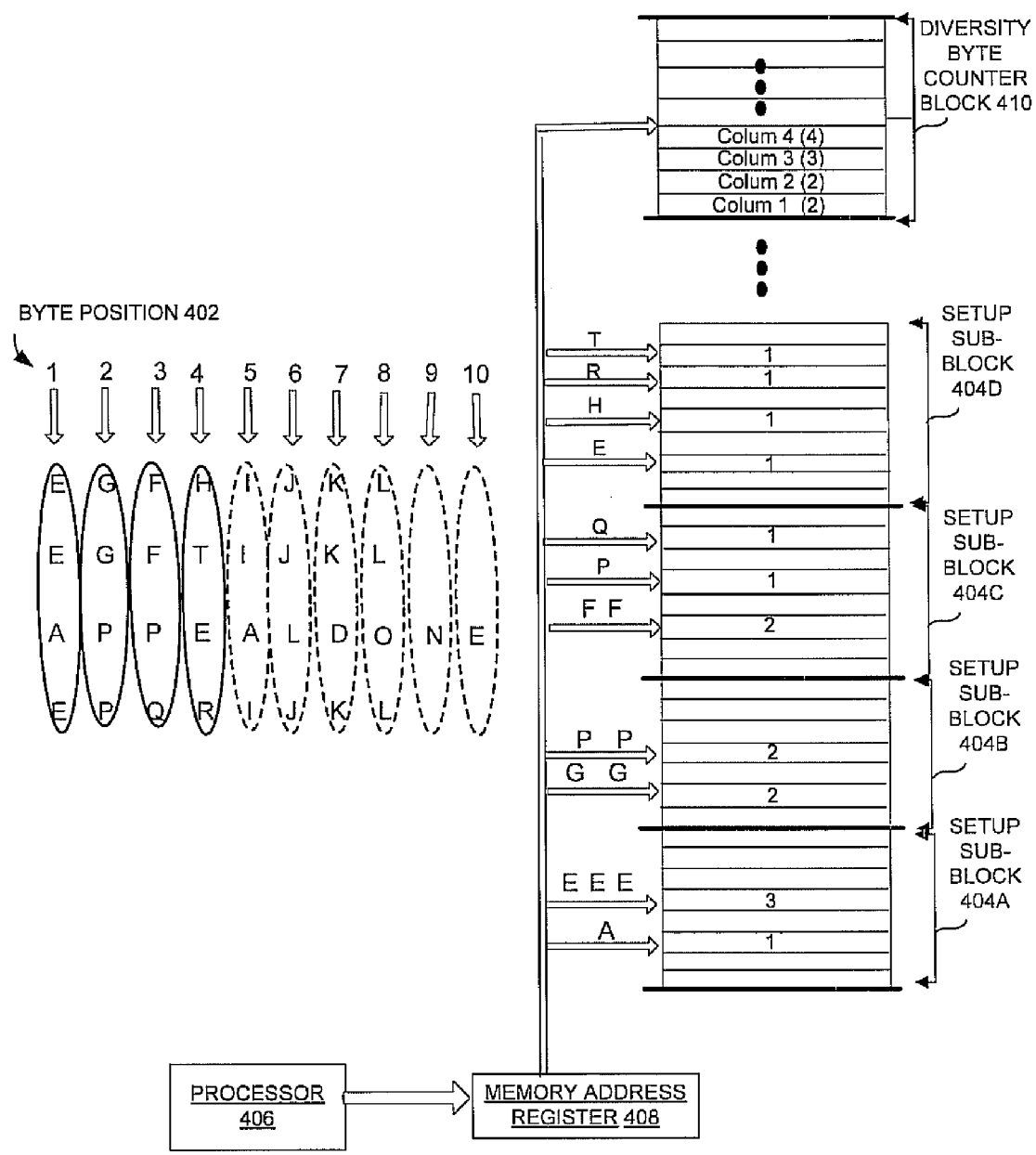
FIG. 4 illustrates an exemplary computer executable process for determining positions for diversity strings in the data patterns, according to one embodiment.

FIG. 4 illustrates an exemplary computer executable process for determining positions for diversity strings in data patterns, according to one embodiment. It is appreciated that this process determines as which column or byte position has the highest number of diversity bytes in it. In one embodiment, the computer executable process for determining the byte position for the diversity strings includes counting a number of different data bytes across the data patterns for each data byte position, and selecting the position based on the number of different bytes. It is appreciated that each data byte position ranges from a first data byte of each data pattern to a last data byte of the longest data pattern.

As a first step, the data bytes of each data pattern are assigned with their respective data byte positions 402. As illustrated in FIG. 4, for the data pattern "EGFHIJKL," "E" is assigned as the first data byte position, "G" as the second data byte position, "F" as the third data type position, "H" as the fourth data byte position, "I" as the fifth data byte position, "J" as the sixth data byte position, "K" as the seventh data byte position, and "L" as the eighth data byte position. The process is repeated for the data pattern "EGFTIJKL," "APPEALDONE," and "EPQRIJKL."

In the exemplary computer executable process, each of the columns or data byte positions is assigned with a reserved memory setup sub-block. For example, a memory set-up sub-block 404A is reserved for the first column or data byte position and so on. In this exemplary implementation, the size of each setup sub-block is set to 256 bytes to cover ASCII characters. It is appreciated that the number of memory blocks reserved as "setup sub-blocks" is equal to the number of columns or byte positions of the longest data pattern. In FIG. 4, the first entry of the first column is consisted of byte "E". This entry is selected and a processor 406 transfers the binary value of "E" to a memory address register 408. The memory register 408 accesses the memory location number of "E", i.e., 01000101 which is binary equivalent to the byte "E". The memory address register 408 accesses the memory location of 69 in the setup sub-block 404A reserved for all the entries of the first column. Then, the corresponding memory location in the setup sub-block 404A is marked. When a memory location in the setup sub-blocks is marked with the byte entry of "E", a counter entry for the corresponding column or byte position in a diversity byte counter block 410 is incremented. The counter entry is added to the diversity byte counter block 410 only when it is new entry.

As illustrated in FIG. 4, there are three "E"s and one "A" in the first column or byte position. This means that the first setup sub-block 404A is accessed four times, i.e., once for "A" and three times for "E". After the first access by "E", the two more memory accesses by the two Es don't cause the counter entry for the first column or byte position in the diversity byte counter block 410 to be incremented. So, with the single entry of "A", the counter entry for the first column tallies to 2. The diversity byte counter block 410 keeps track of number for the number of byte variability as counted in each of the column. As shown in FIG. 4, the diversity byte counter block 410 has four counter entries for the first to fourth columns or data byte positions for the data patterns. In FIG. 4, the counter entry for the second column tallies to 2, the counter entry for the third column to 3, and the counter entry for the fourth column to 4. It is appreciated that more counter entries for additional columns can be entered to the diversity byte counter block 410, although in this particular example, the first four columns for the four data patterns are displayed. As illustrated in FIG. 4, the counter entries of the diversity byte counter block 410 reports as how different data byte entries are present across each byte position of the four data patterns. The result shows that the fourth column of the data patterns has the highest diversity.

Figure 5:
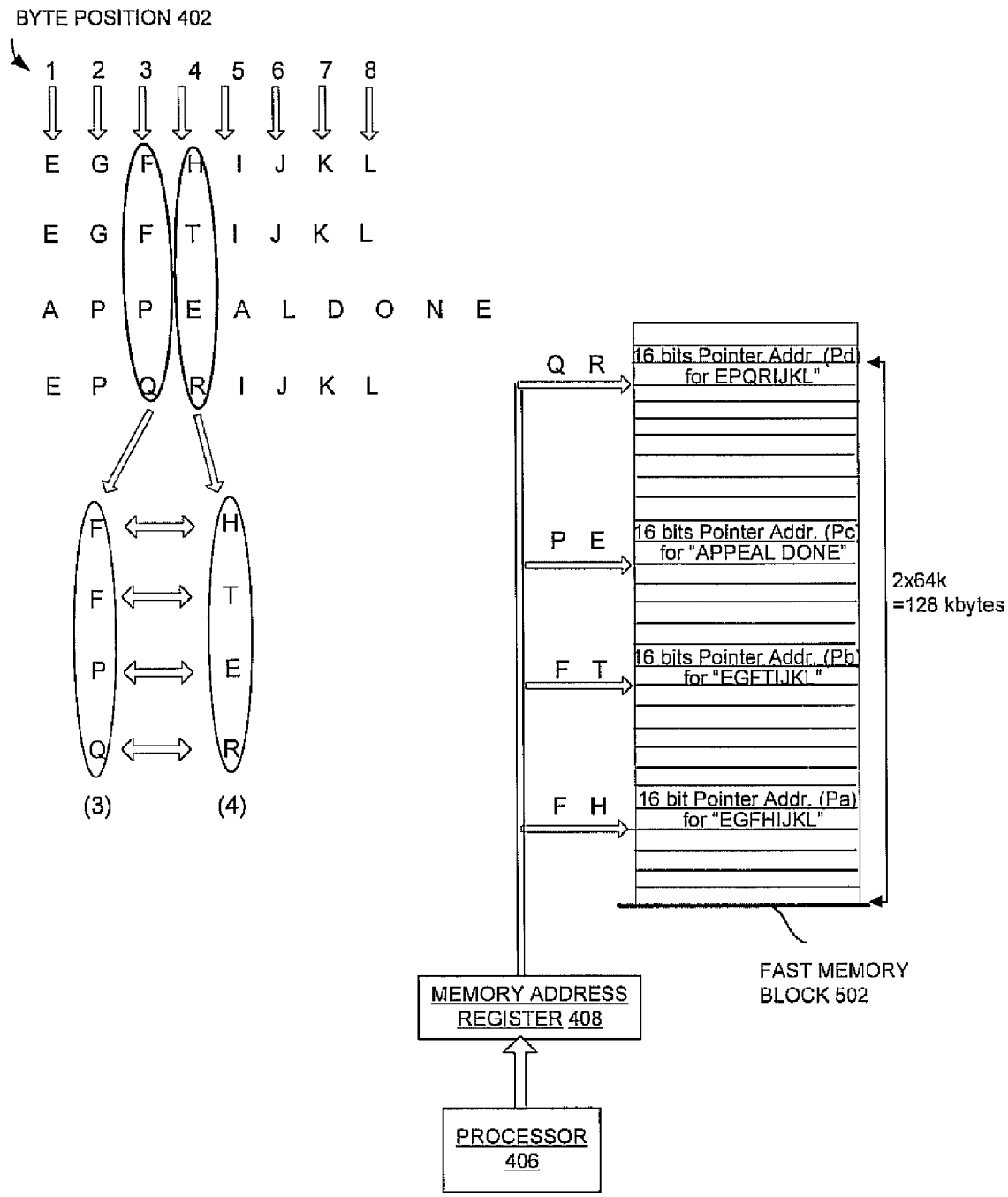
FIG. 5 illustrates an exemplary computer executable process for forming diversity strings for data patterns, according to one embodiment.

FIG. 5 illustrates an exemplary computer executable process for forming diversity strings for data patterns, according to one embodiment. In FIG. 5, this is achieved through joining the two columns identified as having the two highest diversity data bytes. In FIG. 5, the fourth column of the four patterns has four different data bytes, and the third column has three different data bytes. By combining the two most diverse bytes across the data patterns, there is a good chance of creating higher diversity among the data patterns. It is appreciated that two or more bytes can be combined to create the diversity strings in a similar way.

The respective entries of the two columns across the data patterns are combined together, resulting in two byte strings. The first resulting 2 byte string "FH", which is a 16 bit number, is fed to the memory address register 408. The memory address register 408 accesses the corresponding memory location in a fast memory block 502 based on the 16 bit number representing diversity string "FH", and writes a pointer address to the memory location. It is appreciated that the fast memory block 502 refers to a memory location which could be available in L1 or L2 cache of a microprocessor. As the name suggests, the access time for the fast memory is very fast. It is also appreciated that the pointer address points to a shared memory location where the actual data pattern, which is "EGFHIJKL" which correspond to the diversity string "FH", is stored. It is further appreciated that the shared memory location refers to the main memory of a computer which has a RAM much larger than 1 Gigabyte but has a slow access time. Each pointer address refers to a unique memory location where each of the data patterns is stored. Similarly, the two bytes combinations resulting from each entry of the third column and the fourth column are accessed in the fast memory block 502. These entries are "FT", "PE", and "QR". Pointer addresses Pa, Pb, Pc, and Pd for the four data patterns which correspond to the four diversity strings are stored in the fast memory block 502.

Figure 6:
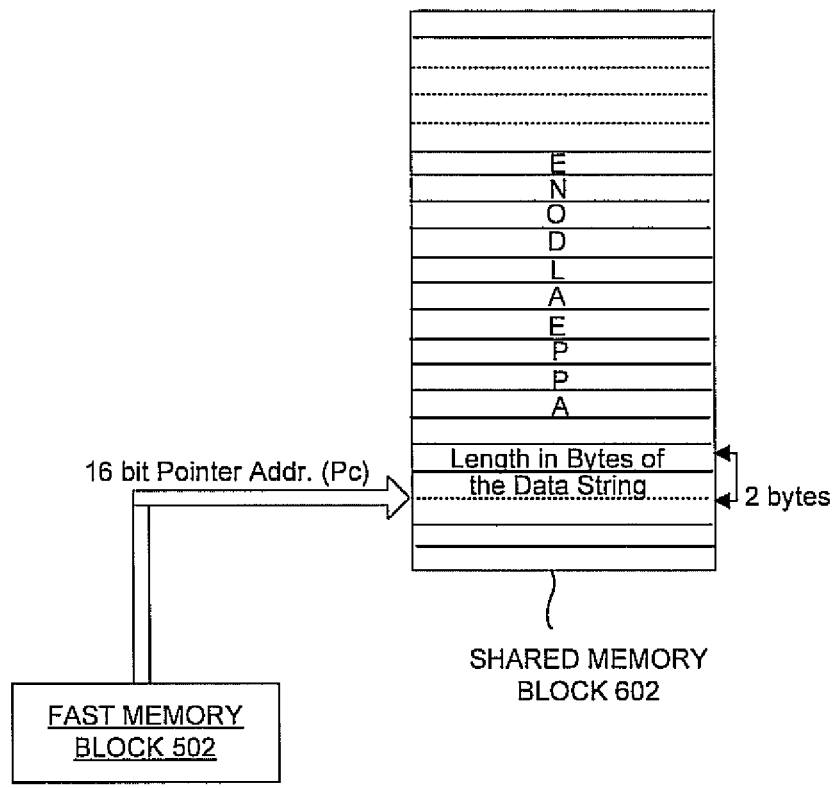
FIG. 6 illustrates an exemplary computer executable process for storing a data pattern which corresponds to a diversity string, according to one embodiment.

FIG. 6 illustrates an exemplary computer executable process for storing a data pattern which corresponds to a diversity string, according to one embodiment. In FIG. 6, the 16 bit pointer address Pc is a 16 bit quasi random number generated by the memory address register 408 of FIG. 5, and is used to store data pattern "APPEALDONE" which corresponds to data string "PE" of FIG. 5 to a shared memory block 602. As illustrated in FIG. 6, the first two bytes of the pointer address Pc contains the length of the data pattern, so that the entirety of the data pattern can be accessed if the pointer address Pc is accessed later for pattern matching.

Figure 7:
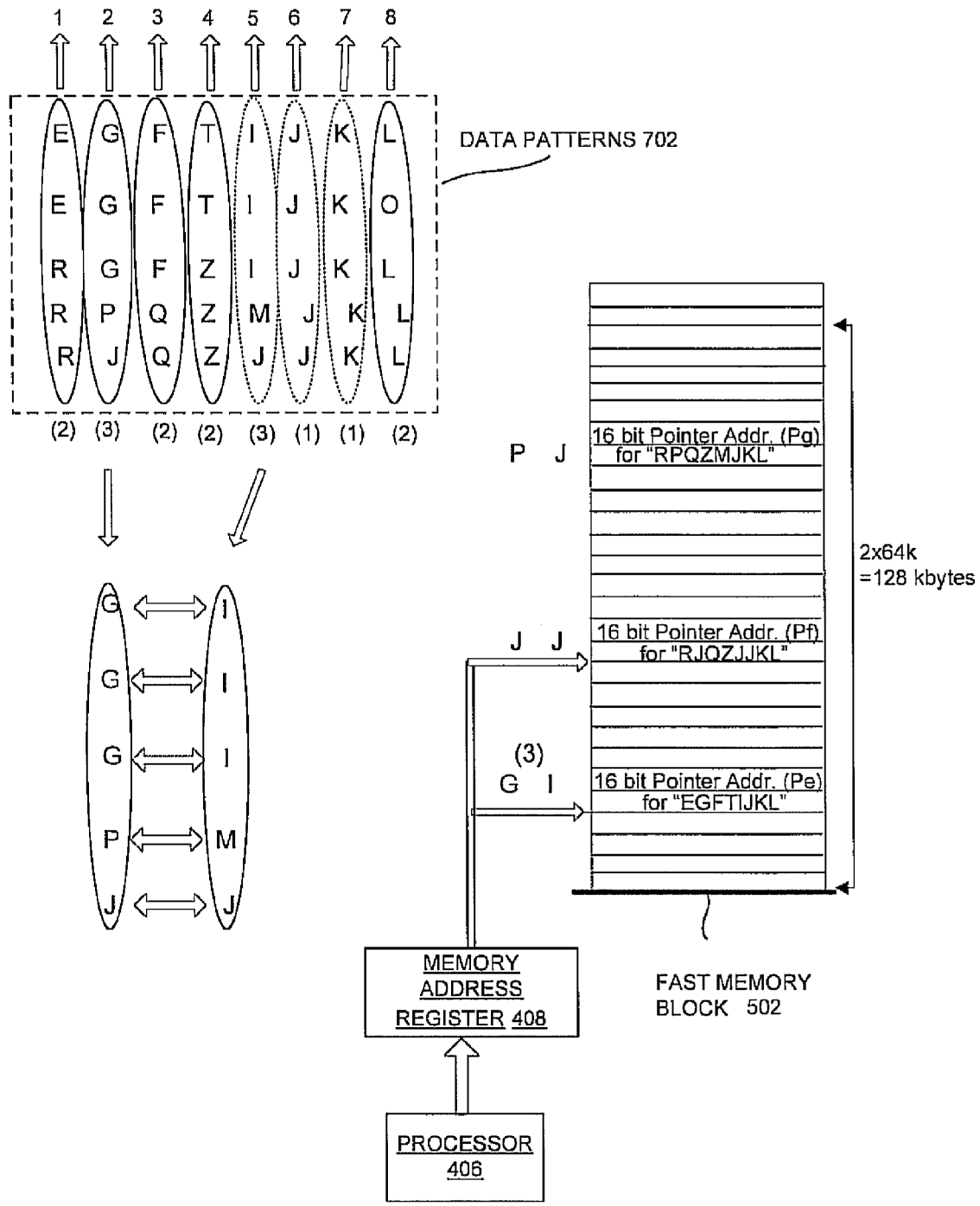
FIG. 7 illustrates a collision of three identical diversity strings present in data patterns, according to one embodiment.

FIG. 7 illustrates a collision of three identical diversity strings present in data patterns, according to one embodiment. The collision refers to a situation where multiple identical diversity strings accessing a same memory location in the fast memory block 502. As illustrated in FIG. 7, the second column and the fifth column are combined together to produce five diversity strings for the data patterns 702. Among the diversity strings, there are three entries for diversity string "GI", one entry for diversity string "PM", and one entry for diversity string "JJ". As a result all of the three occurrences for the diversity string "GI" may end up accessing the same memory location. This means that only the first occurrence will be able to store its 16 bit quasi-random pointer address Pe generated by the memory address register 408.

Figure 8:
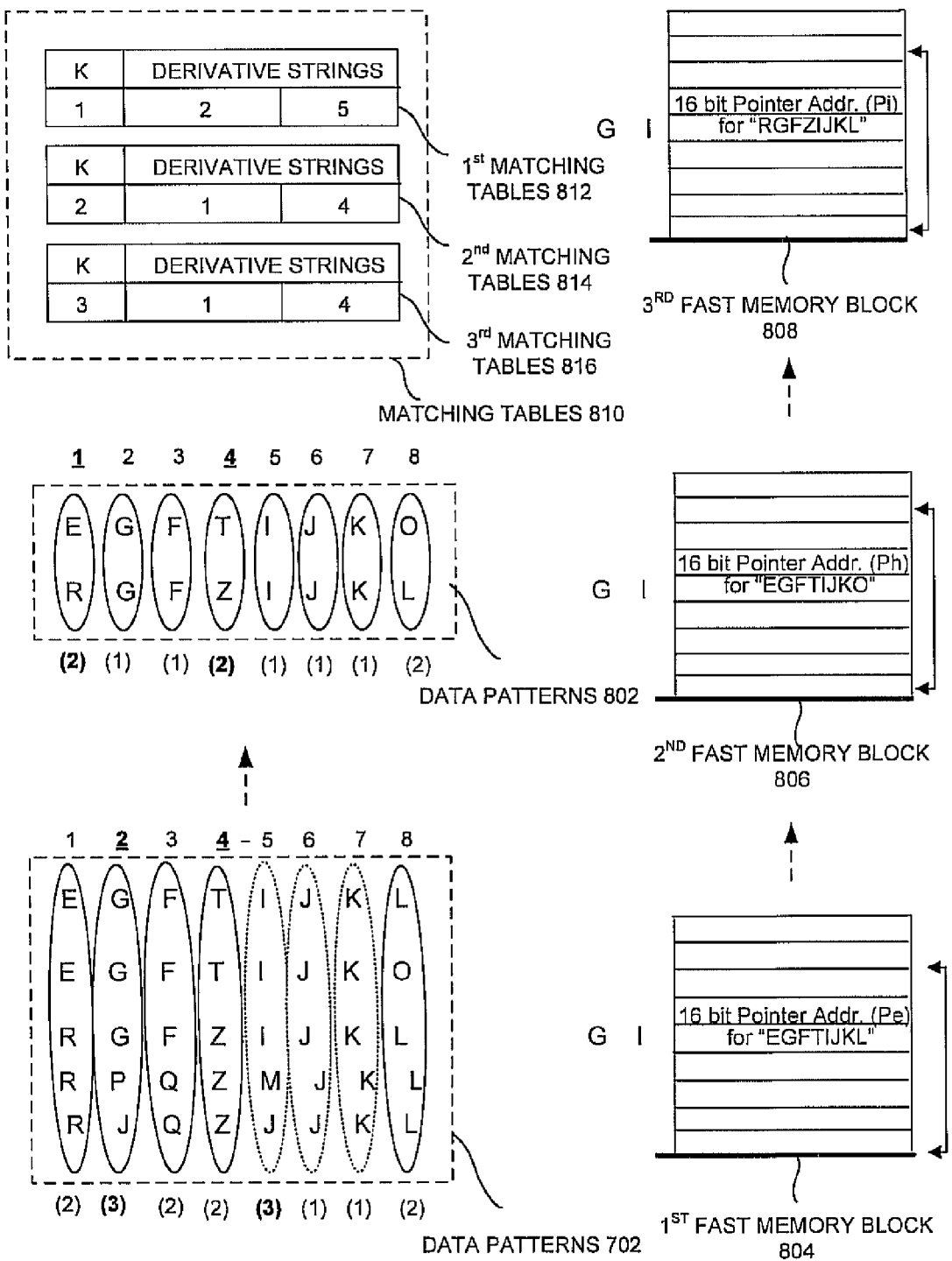
FIG. 8 illustrates an exemplary computer executable process for storing collided diversity strings in different fast memory locations, according to one embodiment.

FIG. 8 illustrates an exemplary computer executable process for storing collided diversity strings in different fast memory locations, according to one embodiment. In FIG. 8, the data patterns 702 include the three identical diversity strings. As the first step, the first of the three identical diversity strings is stored in the $1^{st}$ fast memory block 804 which corresponds to a numerical equivalent of the diversity string "GI" (e.g., 0010011100101001). Then, new byte positions which best differentiate the remainders of the data patterns associated with the identical diversity strings are determined.

In FIG. 8, between the two data patterns 802 having the diversity string "GI", the first and fourth columns or data byte positions can best differentiate these two data patterns 802. Thus, the data byte positions are stored in the shared memory as will be illustrated in FIG. 9. Additionally, the second diversity string "GI" is stored in the second fast memory block 806, and the third diversity string "GI" is stored in the third fast memory block 808. Furthermore, matching tables 810 are generated for the three different levels of fast memory blocks. The first matching table 812 indicates the byte positions of diversity strings for the data patterns 702 to be the $2^{nd}$ and the $5^{th}$ bytes, and it is associated with the $1^{st}$ fast memory block 804. The second matching table 814 and the third matching table indicate the byte positions of diversity strings for the data pattern 802 to be the $1^{st}$ and the $4^{th}$ bytes, where the second matching table 814 is associated with the $2^{nd}$ fast memory block 806 and where the third matching table 816 is associated with the $3^{rd}$ fast memory block 808.

Figure 9:
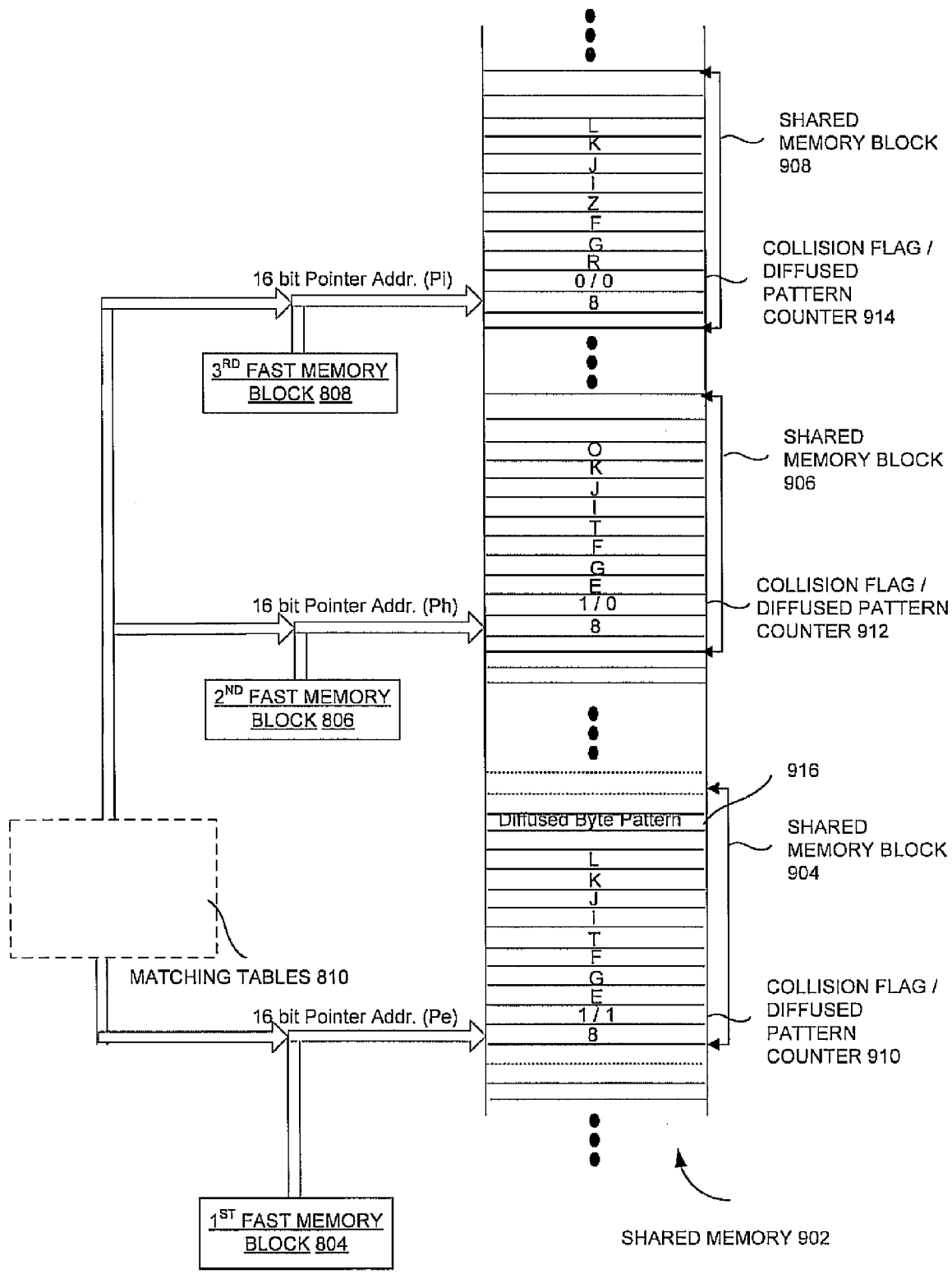
FIG. 9 illustrates an exemplary computer executable process for storing data patterns associated with collided diversity strings, according to one embodiment.

FIG. 9 illustrates an exemplary computer executable process for storing data patterns associated with collided diversity strings, according to one embodiment. In FIG. 9, the data pattern "EGFTIJKL" is stored on per byte basis in a shared memory 902. As illustrated in FIG. 6, the first two bytes of shared memory block 904 stores the length of the data pattern being stored in the shared memory block 904. Then, next byte stores a collision flag/diffused pattern counter 910. In FIG. 9, the collision flag 910 is set to "1/1" which means that there is one or more data patterns with their diversity strings colliding with the diversity string of the data pattern stored in the shared memory block 904 and that there is a single diffused data pattern (e.g., diffused byte pattern 916) associated with the data pattern stored in the shared memory block 904.

A collision flag/diffused pattern counter 912 for the shared memory block 906 is set to "1/0" which means that there is one or more data patterns with their diversity strings colliding with the diversity string "GI" of the data pattern stored in the shared memory block 906 and that there is no diffused data pattern associated with the data pattern stored in the shared memory block 906. Thus, when the data pattern is accessed later for comparison with a data segment, its $1^{st}$ and $4^{th}$ data bytes of the data pattern are compared with corresponding bytes of the data segment according to the matching tables 810. A collision flag/diffused pattern counter 914 for the shared memory block 906 is set to "0/0" which means that there is no data pattern with their diversity strings colliding with the diversity string "GI" of the data pattern stored in the shared memory block 908 and that there is no diffused data pattern associated with the data pattern stored in the shared memory block 908. Thus, when the data pattern is accessed later for comparison with a data segment, its $1^{st}$ and $4^{th}$ data bytes are compared with corresponding bytes of the data segment according to the matching tables 810. It is appreciated that the $2^{nd}$ field of the collision flag/diffused pattern counter 914 may be formed of multiple bytes, where the numeric equivalent of the multiple bytes represents the total number of diffused data patterns associated with the data pattern stored in the shared memory block. It is also appreciated that the collision flag and the diffused pattern are two independent concepts and fields.

Figure 10:
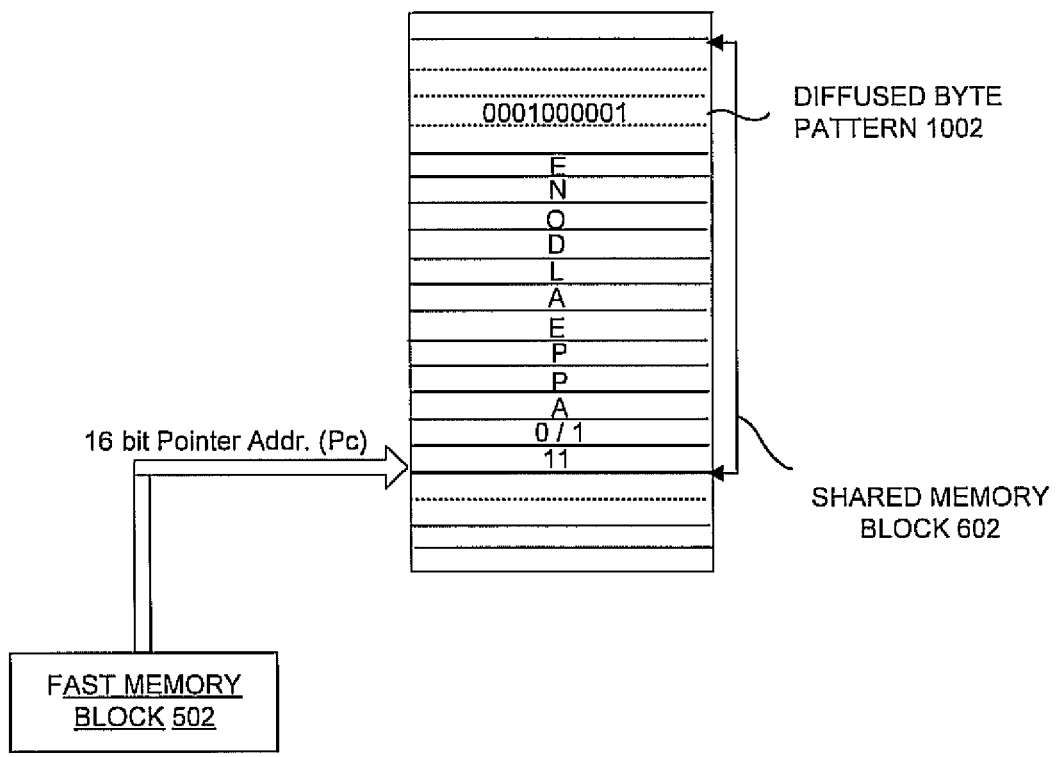
FIG. 10 illustrates an exemplary computer executable process for storing a diffused byte pattern associated with a data pattern, according to one embodiment.

FIG. 10 illustrates an exemplary computer executable process for storing a diffused byte pattern 1002 associated with a data pattern, according to one embodiment. By storing the diffused pattern 1002 "0001000001" associated with the data pattern "APPEALDONE" to the shared memory block 602, the fourth bytes and the tenth byte of the data pattern are stored as "don't care bytes". It is appreciated that two patterns are regarded as identical if an exclusive OR (XOR) logical operations performed on byte basis to both a segment of the data block 102 of FIG. 1 and the data pattern yield zeroes. For example, if a user selects data on the third data position and the tenth data byte position as the "don't care" bytes, then "00010000010" is stored as the diffused pattern 1002. Accordingly, any segment of the data block, which has byte patterns "APXEALDOXE", would result in match with the data pattern "APPEALDONE".

Figure 11:
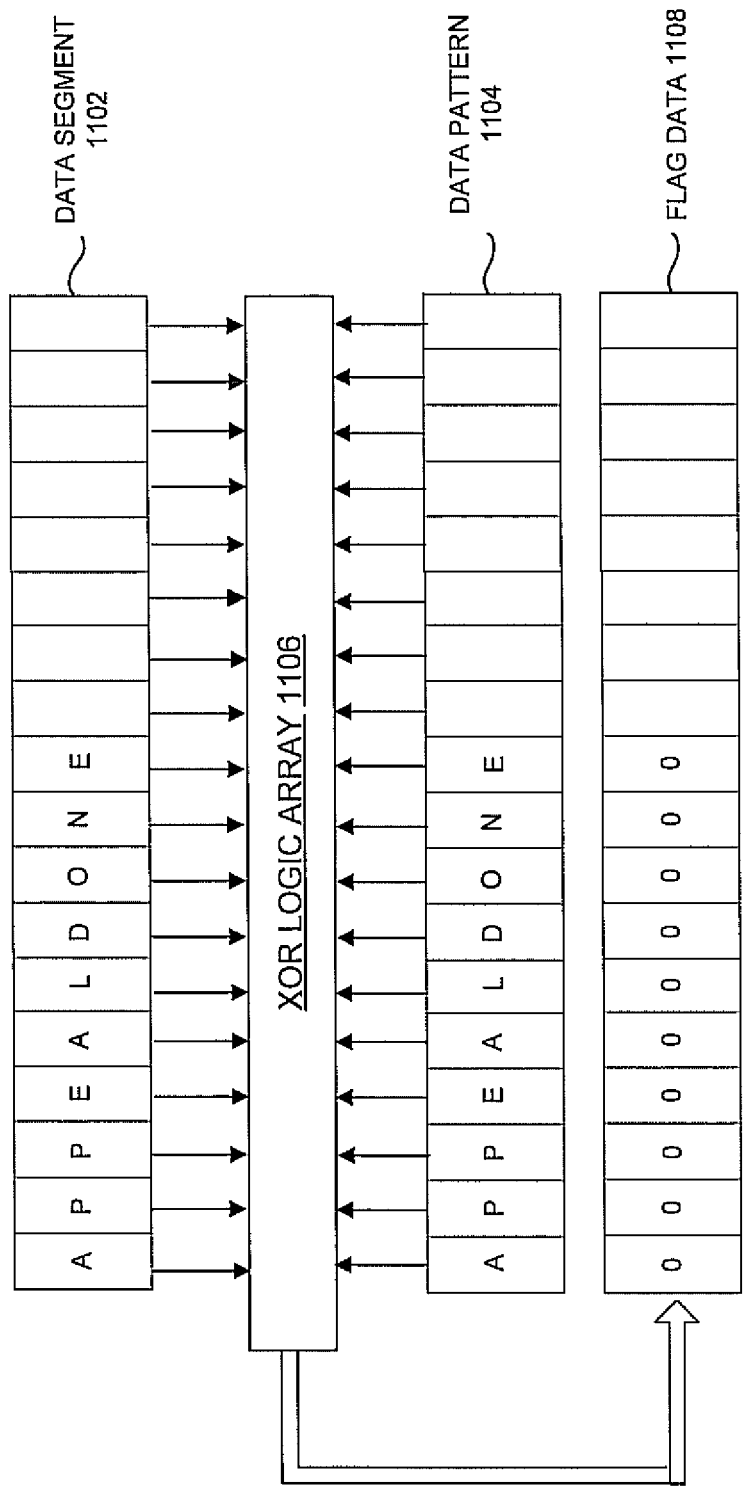
FIG. 11 illustrates an exemplary register level operation to compare a data segment with a data pattern, according to one embodiment.

FIG. 11 illustrates an exemplary register level operation to compare data segment 1102 with data pattern 1104, according to one embodiment. In FIG. 11, Individual bytes in the data segment 1102 and individual bytes of the data pattern 1104 are independently matched together through an XOR operation performed through a XOR logic array 1106. If two corresponding bytes of the data segment 1102 and the data pattern 1104 for each column are matched, then a respective bit of flag data 1108 is set as "0". It is appreciated that the data segment 1102 can be stored in a first register, the data pattern in a second register 1104, and the flag data 1108 in a third register.

Figure 12:
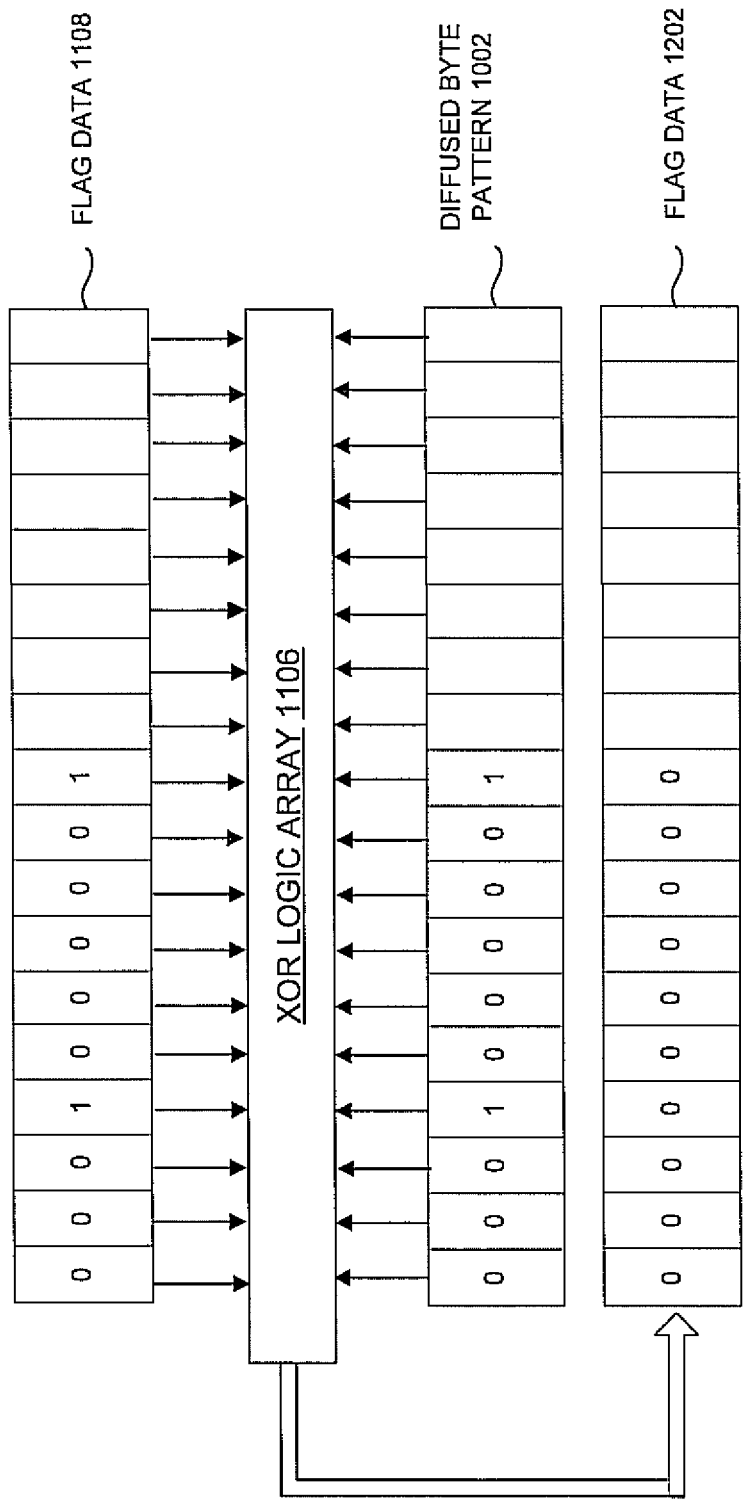
FIG. 12 illustrates an exemplary register level operation to compare the flag data 1102 with the diffused byte pattern, according to one embodiment.

FIG. 12 illustrates an exemplary register level operation to compare the flag data 1102 with the diffused byte pattern 1102, according to one embodiment. In FIG. 12, the flag data 1102 is matched with the diffused pattern 1002 of FIG. 10. If an exclusive OR operation of the flag data 1102 and the diffused byte pattern 1002 results in flag data 1202 having all 0's, the data segment 1102 is regarded as a match for the data pattern 1104. It is appreciated that three different registers can be used for the register level operation.

Figure 13:
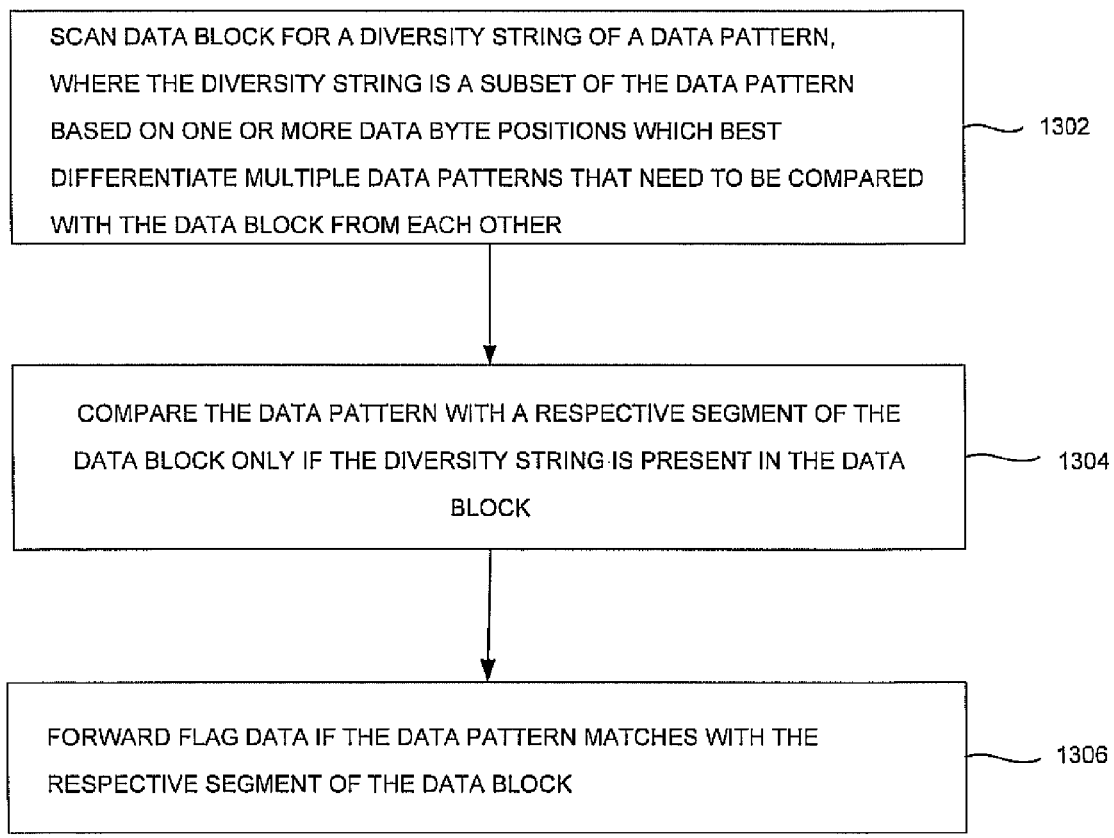
FIG. 13 is a process flow chart of an exemplary method for inspecting data patterns in a data block, according to one embodiment.

FIG. 13 is a process flow chart of an exemplary method for inspecting data patterns in a data block, according to one embodiment. In operation 1302, the data block is scanned for a diversity string of a data pattern, where the diversity string is a subset of the data pattern based on one or more byte positions which best differentiate multiple data patterns that need to be compared with the data block from each other. In operation 1304, a respective segment of the data block is compared with the each data pattern only if the diversity string is present in the data block. In operation 1306, flag data is forwarded if the each data pattern matches with the respective segment of the data block.

Figure 14:
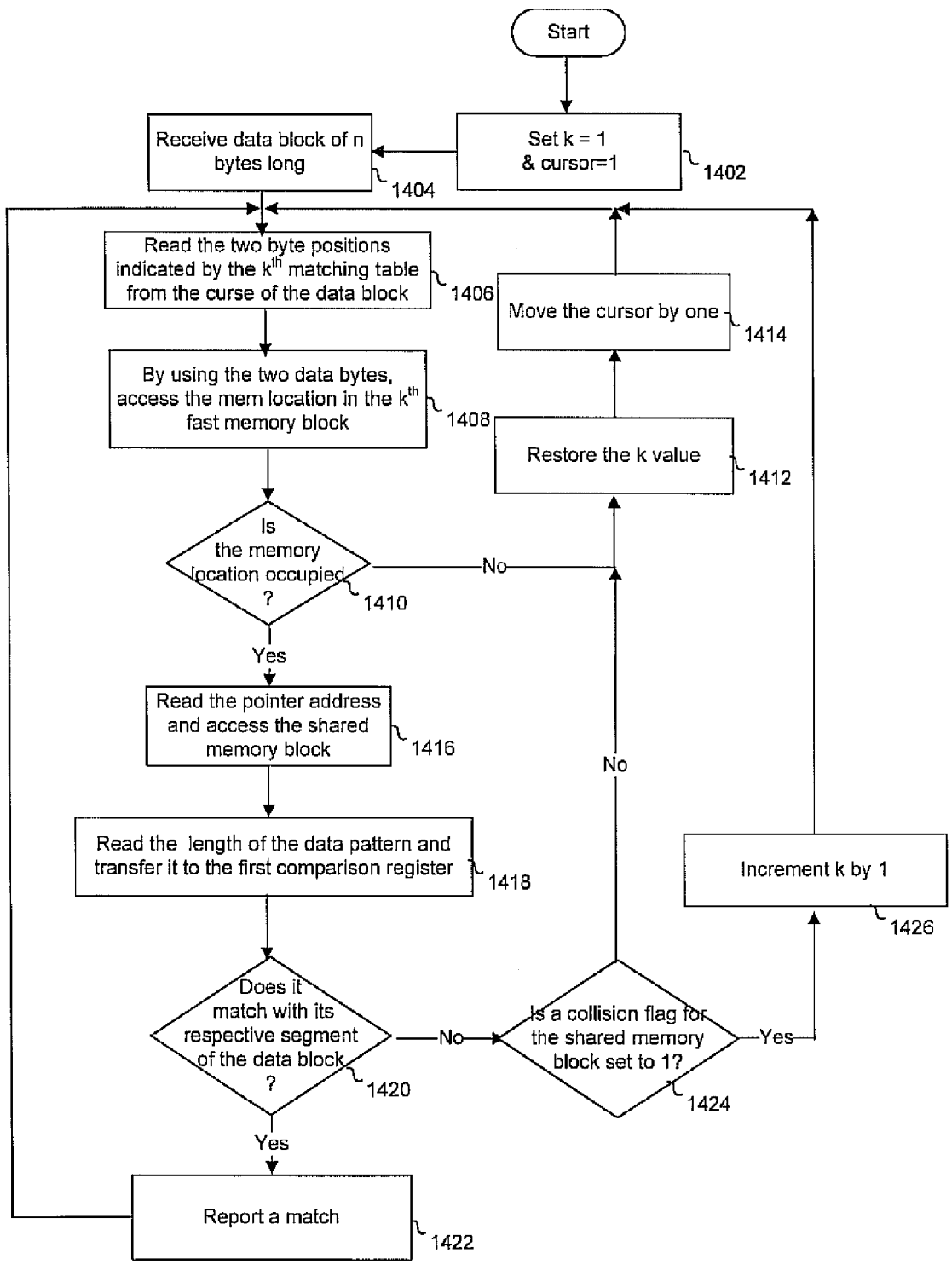
FIG. 14 is an exemplary flow chart which implements the method of FIG. 13, according to one embodiment.

FIG. 14 is an exemplary flow chart which implements the method of FIG. 13, according to one embodiment. In step 1402, both k and cursor position of data block being inspected are set to 1. In step 1404, n-byte long data block is processed. In step 1406, the two byte position indicated by the $k^{th}$ matching table is read from the curse position of the data block. In step 1408, the memory location in the $k^{th}$ memory block is accessed using the two data bytes (e.g., the 16 bit numerical equivalent of the two data bytes). In step 1410, the memory location based on the two data bytes is accessed to see if the data bytes on the two byte positions of the data block are indeed a diversity string. If the memory location is empty, then k is reset to its original value at step 1412, and the cursor position of the data block is moved (e.g., to the right) by one byte position at step 1414. Then, the step 1402 is repeated.

If the memory location is occupied in step 1410, the pointer address is read to access the data pattern in the corresponding shared memory block in step 1416. Then, in step 1418, the length of the data pattern is read, and the data pattern is transferred to the first comparison register. Then, it is matched with its respective segment of the data block in step 1420. If there is a match (e.g., a complete match, a partial match, a match with the data pattern's diffused pattern, etc.), then it reports a match in step 1422, and then the step 1406 is repeated. If there is no match, then a collision flag is checked for the shared memory which contains the data pattern in step 1424. If the collision flag is 1, then the step 1406 is revisited with the k increased by 1 in step 1426. If the collision flag is 0, then the step 1412 is revisited.

Figure 15:
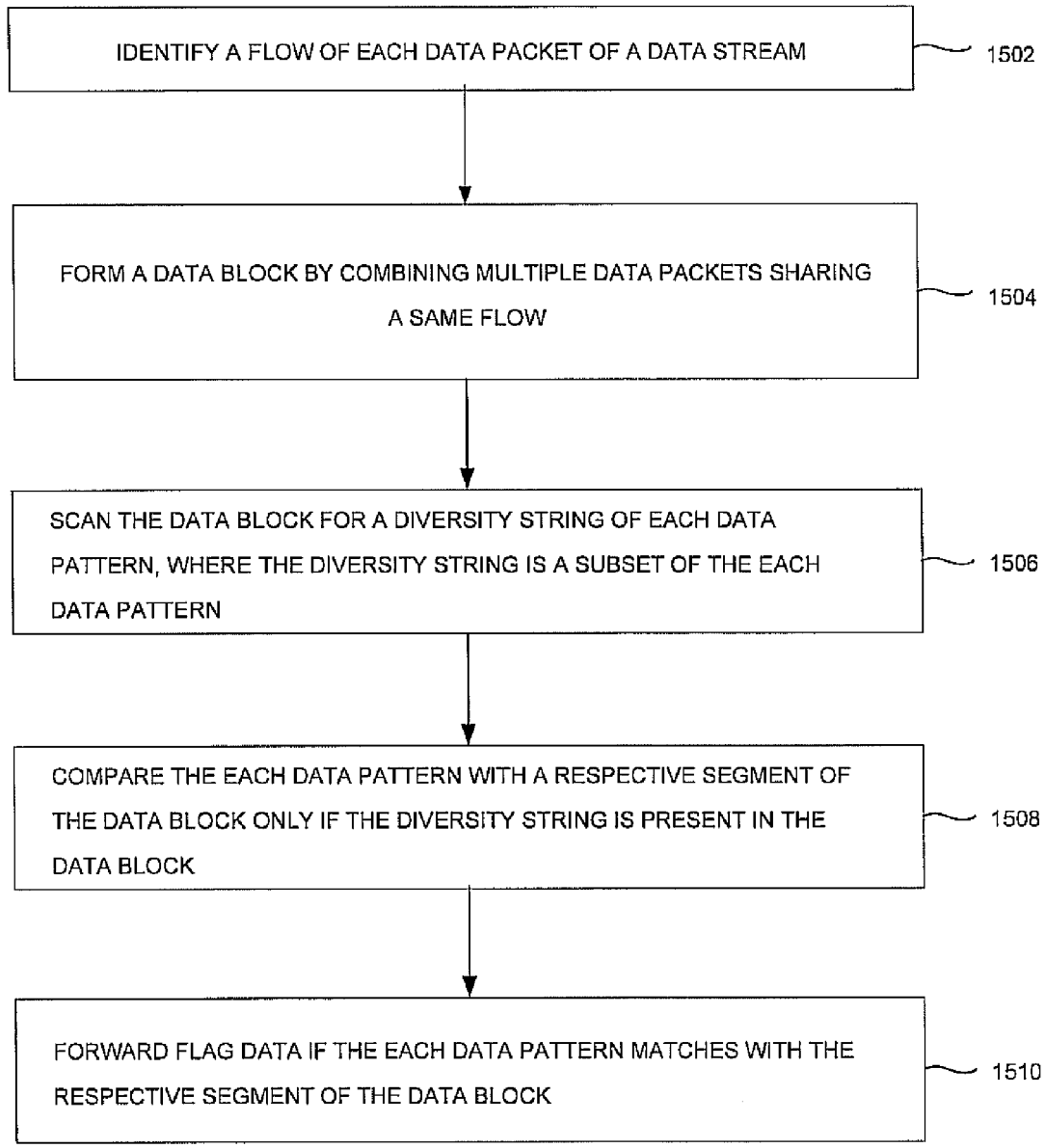
FIG. 15 is a process flow chart of an exemplary method for inspecting data patterns in a data stream of multiple flows, according to one embodiment.

FIG. 15 is a process flow chart of an exemplary method for inspecting data patterns in a data stream of multiple flows, according to one embodiment. In operation 1502, a flow of each data packet of the data stream is identified. In operation 1504, a data block is formed by combining multiple data packets sharing a same flow. It is appreciated that the flow is a sequence of packets from one particular source (e.g., a computer host, process or class of services, etc.) to a single destination (e.g., another computer host, a multicast group, a broadcast domain, a process or a class of services, etc.). As the packets are sent over successive data links towards their destinations, the packets from one flow may be intermingled with packets from other flows also traversing the network. Since it may be that the packets from the one flow need to be handled differently from other flows, by means of separate queues in switches, routers and network adapters, to achieve traffic shaping, fair queuing or quality of service.

In operation 1506, the data block is scanned for a diversity string of each data pattern, where the diversity string is a subset of its respective data pattern. In operation 1508, a respective segment of the data block is compared with the each data pattern only if the diversity string is present in the data block. In operation 1510, flag data is forwarded if the each data pattern matches with the respective segment of the data block. It is appreciated that the pattern matching for the data stream of multiple flows may be initiated when the length of one or more data packets combined for each flow is equal or longer than the length of the shortest data pattern.

Figure 16:
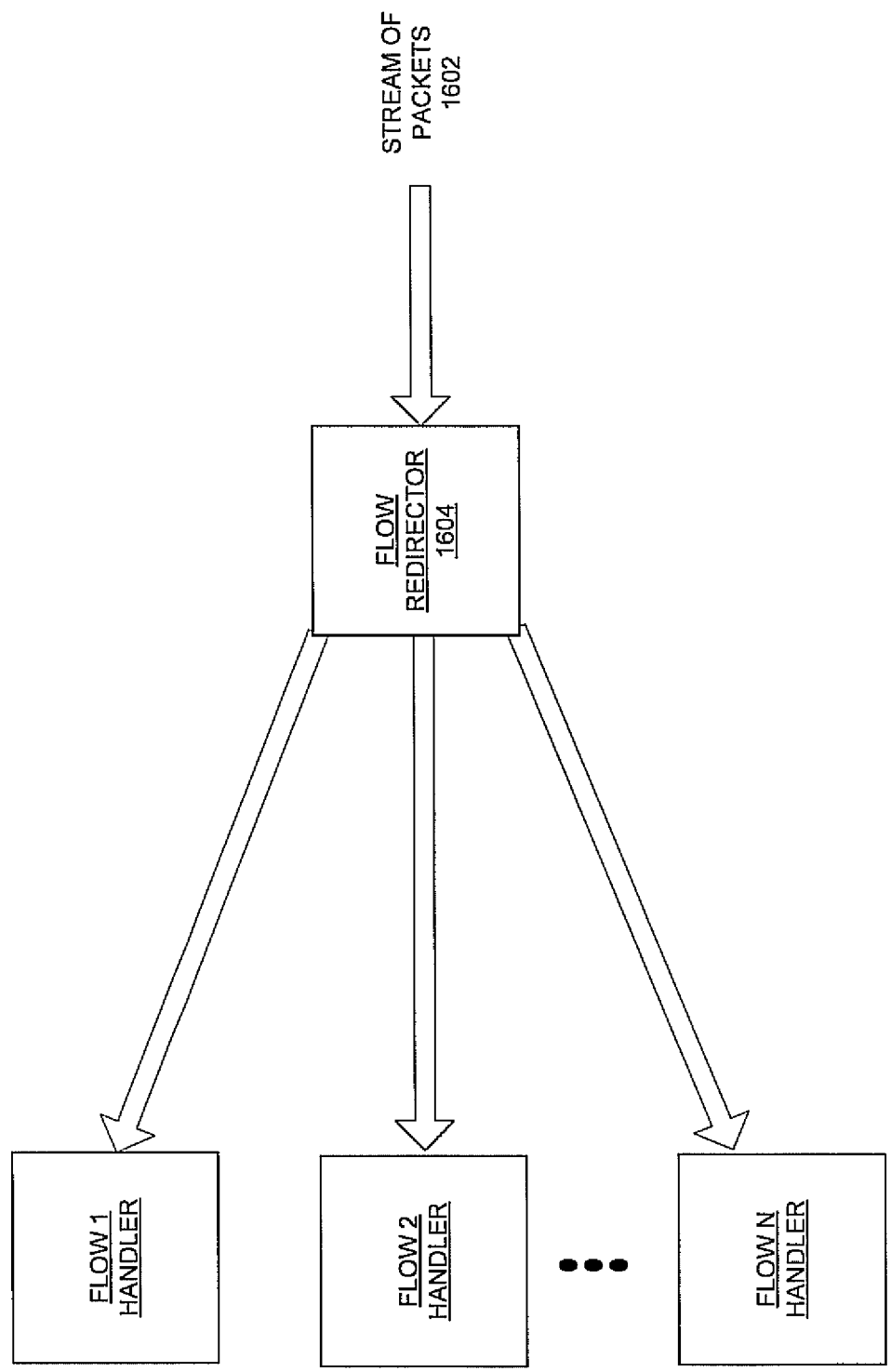
FIG. 16 illustrates an exemplary scheme for identifying flows, according to one embodiment, according to one embodiment.

FIG. 16 illustrates an exemplary scheme for identifying flows, according to one embodiment. A flow comprises a data connection that is based on a stream of packets 1602. A data pattern or patterns a user is interested in inspecting can be fragmented into the stream of packets 1602. Thus, it may be necessary to combine all the data within a stream of packets 1602 based on their respective flows.

As illustrated in FIG. 16, the stream of packets 1602 in multiple flows is fed to a flow director 1604. The flow director 1604 checks out particular fields in each of the packets, and identifies the flow to which the packet belongs. Once it identifies the flow of the packet, then it directs the packet to an appropriate flow handler shown as flow 1 handler through flow n handler. In one embodiment, multiple processors can be used to handle a specific set of flows. The use of multiple processors can increase processing power by identifying and redirecting flows to their respective processors.

Figure 17:
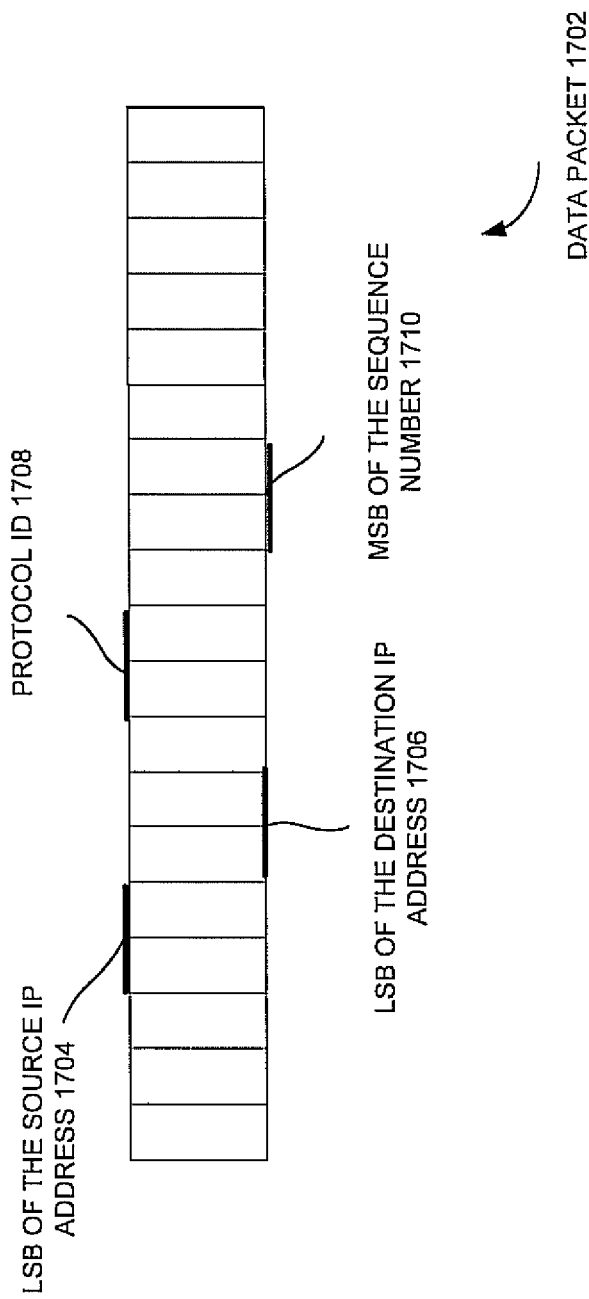
FIG. 17 illustrates an exemplary flow identifier for a data packet, according to one embodiment.

FIG. 17 illustrates an exemplary flow identifier for a data packet 1702, according to one embodiment. In the data packet 1702, there are particular field locations which uniquely identify as which flow the packet 1702 belongs to. For example, in an IP packet, a flow can be identified through a source IP address, a destination IP Address, a protocol ID, a sequence, and acknowledgment number (in the case of TCP flow). However, the addition of the above fields result in 17 bytes (e.g., 8 bytes for the source and destination IP addresses for IP version 4, 1 byte for the IP Protocol ID, and 8 bytes for the sequence and acknowledgment fields). The 17 byte long identifier is too large to be used in a memory address register since a RAM size that can accommodate addresses generated by the 136 bits needs to have at least $8.9 \times 10^{40}$ bytes, which is practically impossible in the current memory infrastructure.

One approach to get around this limitation is to find and select bits in the protocol fields that have a very high likelihood to produce a unique flow identifier. For example, a TCP flow can be identified through a part of the source and destination IP address, the protocol ID and the sequence and acknowledgment field to select a unique flow using a minimum number of bits in the packet. In one embodiment, a flow identifier may include the least significant byte (LSB) of the source IP address 1704 (e.g., 1 byte), the LSB of the destination IP address 1706 (e.g., 1 byte), the protocol ID 1708 (e.g., 1 byte), and the most significant byte (MSB) of the sequence number 1710.

Figure 18:
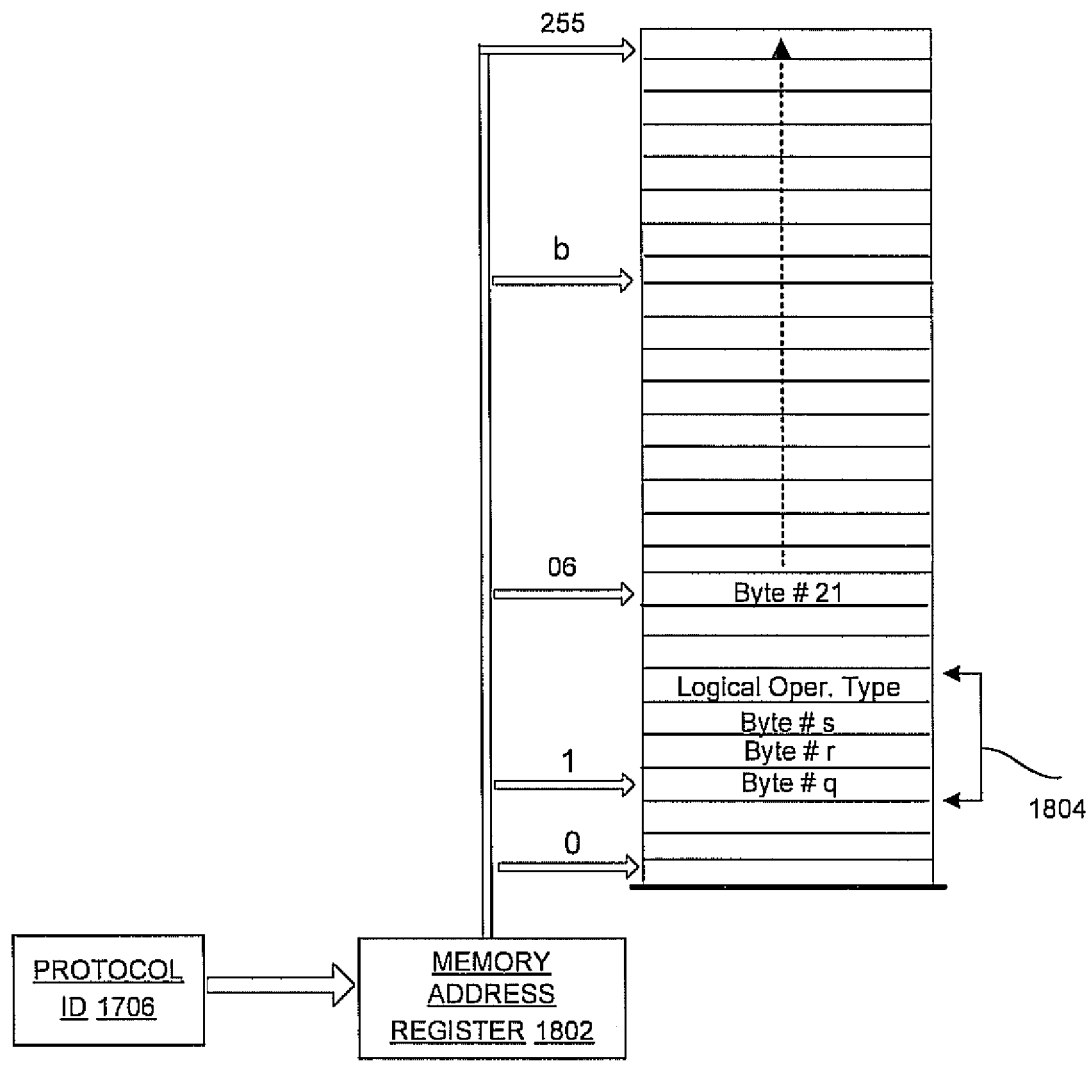
FIG. 18 illustrates an exemplary process of identifying a flow based on a protocol ID, according to one embodiment.

FIG. 18 illustrates an exemplary process of identifying a flow based on a protocol ID 1706, according to one embodiment. As shown, the protocol ID 1706 (e.g., which is 1 byte long and is a part of Internet Protocol) is fed to a memory address register 1802. By using the 8 bits of the protocol ID 1706, the memory address register 1802 can access 256 memory locations. Each memory location can contain a multiple byte long number. The number may tell the processor to which byte number starting from the boundary of a protocol header it should read. For example, if the value of the protocol ID 1706 is 6, then the memory address register 1802 accesses the $6^{th}$ location of the RAM. The numeric number 21 in the memory location tells the processor to read byte number 21 of the packet. The location of the byte number 21 from the start of the IP protocol header, without a header extension, represents the MSB of the TCP sequence number field. Alternatively, a source port number, which is a 2 byte long field of the TCP header, can be used to identify the flow.

In addition, multiple byte locations can be specified to be read within a protocol based on its IP protocol ID. For instance, a memory block 1804 illustrates that if the numeric value of the IP protocol ID is 1, then the processor may be directed to read three bytes (e.g., byte #q, byte #r, and byte #s) and perform a logical operation to them. It is preferable to have one byte as the result of the operation. Other parts of the memory are used to store locations of specific numbers that can be read in response to the Protocol ID.

Figure 19:
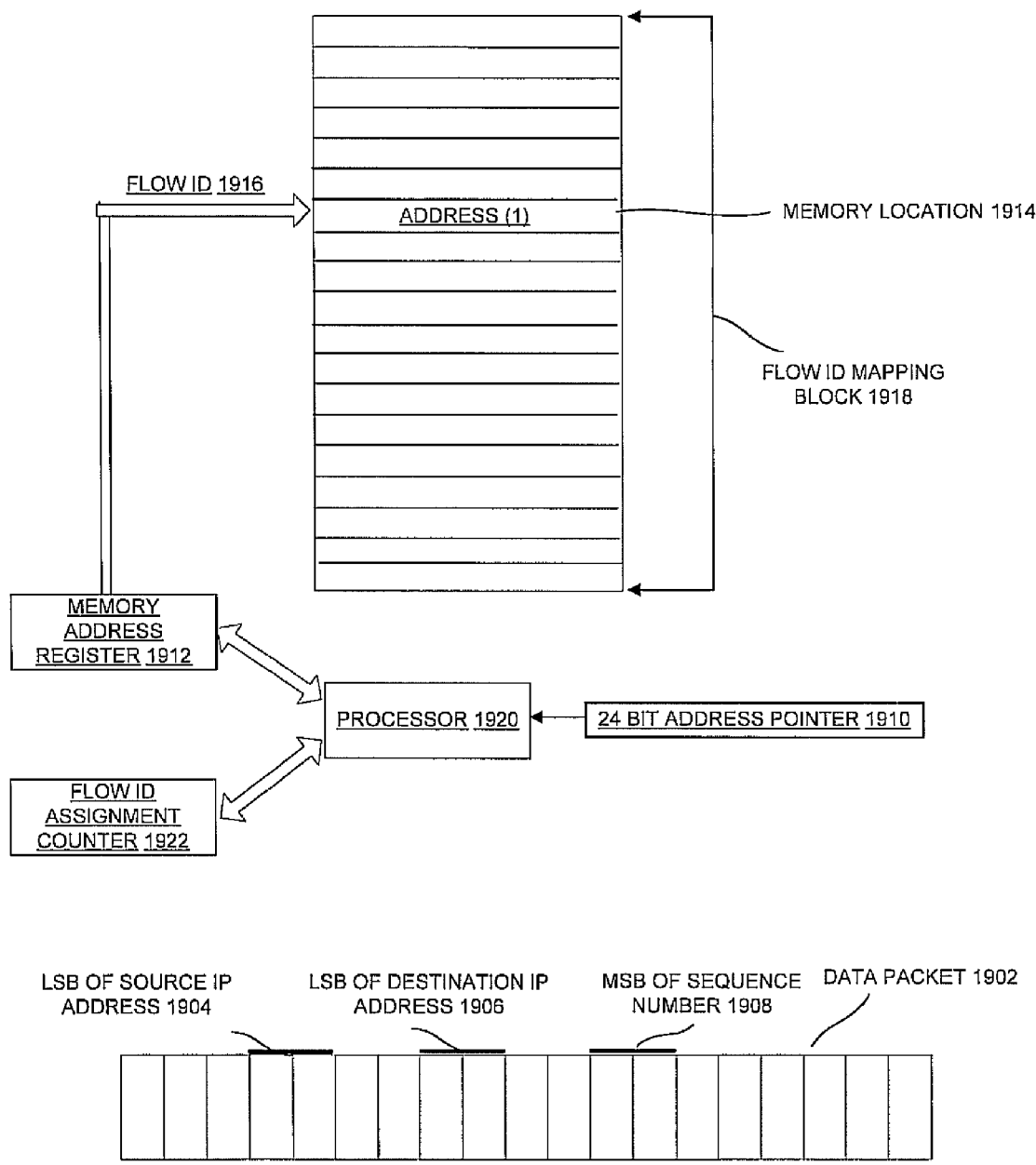
FIG. 19 illustrates an exemplary process of accessing a flow identifier (ID) for a data packet, according to one embodiment.

FIG. 19 illustrates an exemplary process of accessing a flow identifier (ID) 1916 for a data packet 1902, according to one embodiment. If the LSB of IP source address 1904, the LSB of the destination IP address 1906, and the MSB of the sequence number 1908 are combined, a 24 bit address pointer 1910 can be generated. It is appreciated that other fields within the packet that can uniquely identify as which the flow of the packet belongs to can be used to form the flow identifier. For example, the 16 bits of the destination port in the TCP or UDP can be used instead of using 8 bits of MSB of the sequence number. The 24 bit address pointer is then fed to a memory address register 1912 which uniquely addresses a memory location 1914.

This memory location 1914 is a part of 16 bytes/block× 16M address locations reserved as a flow ID mapping block 1918. If the data packet 1902 is an IP/TCP frame, the TCP sequence number (e.g., 32 bit long) in a stream of data packets is incremented linearly per each byte of data packets. In some applications, a single bit increment of the TCP sequence number can mean processing of more than one data byte. The three lower bytes (24 bits) of the TCP sequence number can represent at least 16 Mbytes of data. After the 16 Mbytes of data are processed, the $8^{th}$ bit of the MSB of the sequence number 1908 is incremented. This means that the unique flow or connection ID may be incremented by 1 after 16 Mbytes of data are transferred per each connection or flow.

As discussed each packet can be identified through unique characteristics that tells about the flow of a packet (e.g., the 24 bit address pointer 1910). Once the flow is identified then the flow ID 1916 is used to access the corresponding memory location 1914 in the flow ID mapping block 1918. If this location is vacant then this implies that it was the first incident for the flow. At this point, the processor 1920 accesses the flow ID counter 1922 to determine which memory location is be available in the shared memory block. The processor 1920 reads the next available address location (e.g., address (1)) from the flow ID assignment counter 1922 and put that address in the memory location 1914, where the address in the shared memory block is used to store information pertaining to the flow ID 1916.

Figure 20A:
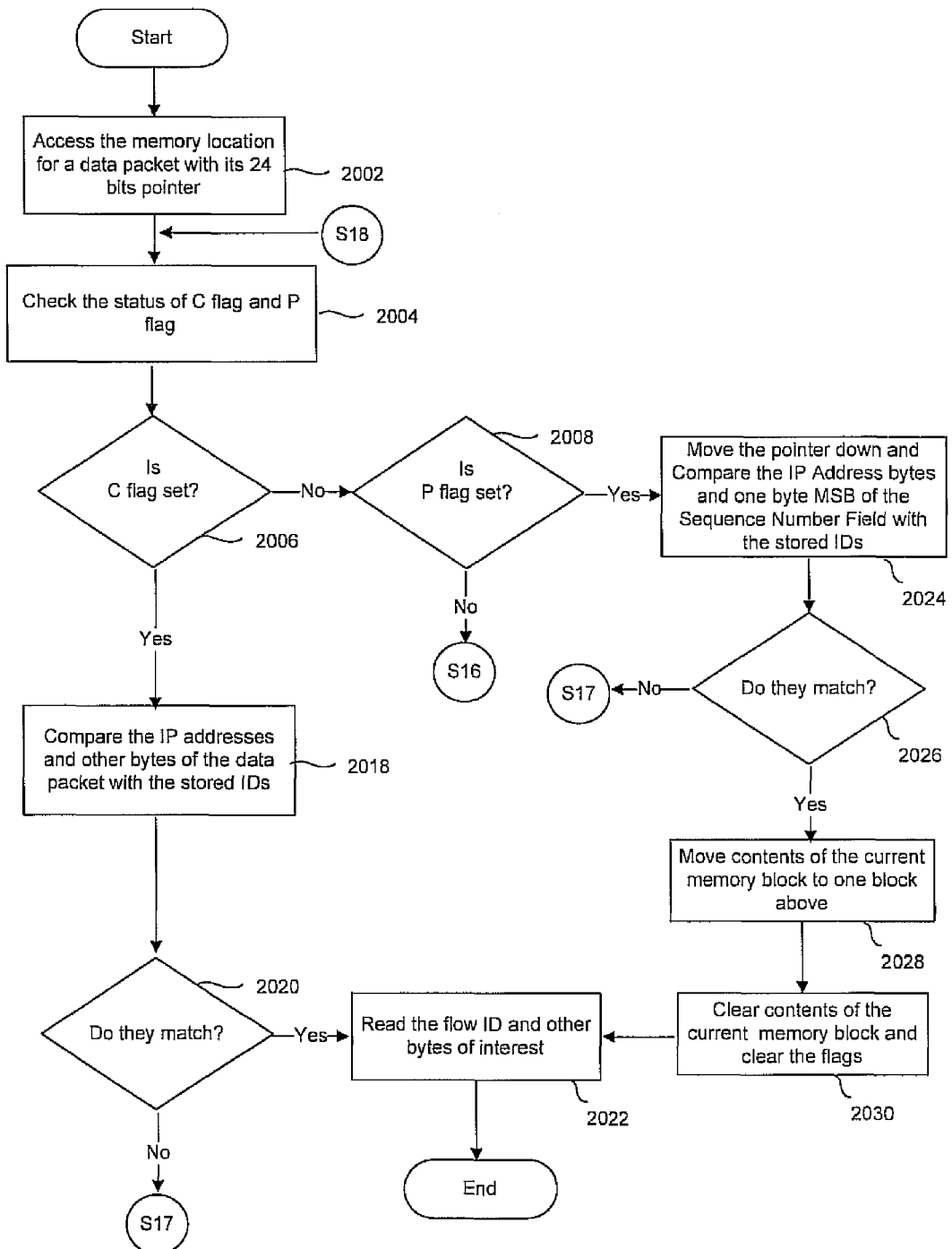
FIG. 20A and FIG. 20B illustrate a flowchart for identifying flows by accessing corresponding addresses in a memory location, according to one embodiment.
Figure 20B:
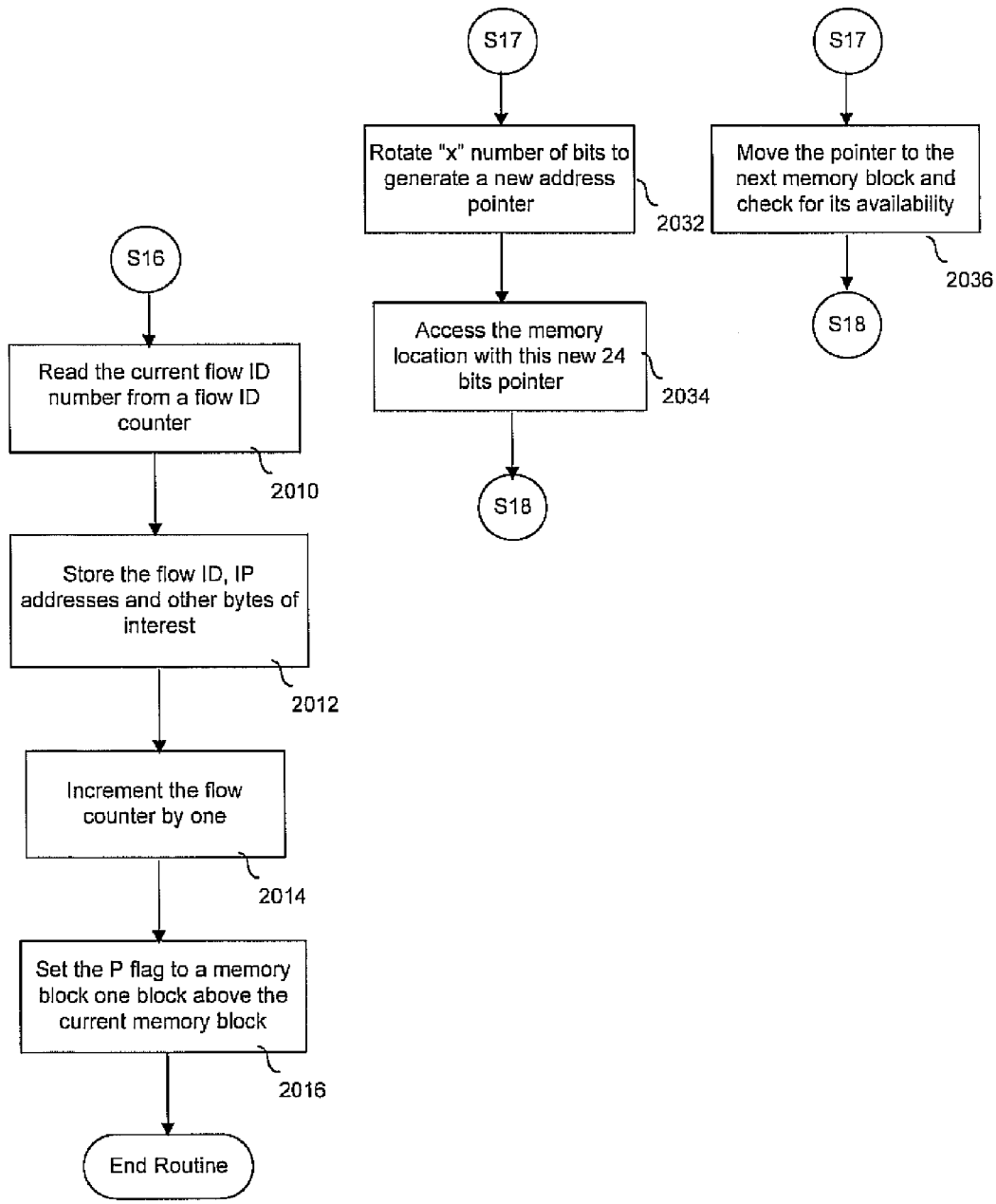

FIG. 20A and FIG. 20B illustrate a flowchart for identifying flows by accessing corresponding addresses in a memory location, according to one embodiment. In step 2002, a 24 bit pointer is used to access a block in a memory location (e.g., having 16×16M unique addresses). In step 2004, the flag status of two flags, a current memory occupied (C) flag and a previous memory occupied (P) flag, are checked. When a particular address block in the memory location is occupied, the C flag is set to 1. This indicates that a respective flow for the particular block is set, so the processor would not write any data to the memory block. The P flag is set when there is data placed in the address block just underneath the current memory block.

In step 2006, the status of the C flag is checked. If the C flag is not set, then the P Flag is checked whether it is set in step 2008. If it is not set, then this implies that this memory block is available and any address pointer accessing this memory block will be establishing a new connection or flow. In step 2010 of FIG. 20B, a respective flows ID is read from a flow counter. In step 2012, the processor stores the flow ID, bytes to be used as a signature, and/or other bytes that may contain information of interest. In step 2014, the flow counter is incremented by one by the flow counter to issue a new Flow ID for a new flow or connection. In step 2016, the processor sets the P flag in the upper adjacent memory block of the memory block to 1. This means when the address pointer identifying the current connection is incremented by one (after 16 M bytes counts), then the P flag can be used to indicate the original connection or flow established in the memory location one block below it.

If the C flag is set, then the six remaining bytes of the source and the destination IP addresses (e.g., three MSBs of the source IP address and the three MSBs of the destination IP address), the two MSBs of the sequence number and/or the two MSBs of acknowledgment number are also compared. This means that the state of the connection is remembered through matching at least twelve bytes. It is appreciated that the 17 bit ($1^{st}$ bit of the third byte of the acknowledgement number) will change after the $3^{rd}$ and $4^{th}$ bytes have rolled over counting to 64 k. Since a typical data packet has 512 bytes, this means that 128 packets (64 k/512=128) would be transmitted before the $17^{th}$ bit is incremented. Thus, a connection which as a loss of 128 packets may be falsely matched with the "signature" stored in the memory block. If only the byte from the acknowledgement number is used for comparison, then 16M bytes worth of data needs to be lost before the stored signature may be falsely matched with the incoming packet signature. If there is a match in step 2020, then the unique flow ID locally assigned to this connection and other bytes stored in the memory block representing other characteristics of the connection are read in step 2022.

If the P flag is set in step 2008, then pointer address is moved one block down, and the IP addresses, sequence number, and/or acknowledgement number are compared with the stored IDs in step 2024. In one embodiment, the stored IDs may contain unique values to identify a particular connection. In TCP, it could be source and destination network addresses, protocol ID, sequence and acknowledgement numbers, port numbers, etc. If they match in step 2026, then all the contents of the memory block is moved to the upper memory block in step 2028. This step is necessary to update the address pointer. In step 2030, the contents of the memory location including the flag are cleared as the information is transferred to the memory location one block above. It is appreciated that memory blocks for finished flows may be cleared to free up the memory.

In step 2022, the assigned flow ID of the connection and other bytes that represent further characteristics of the connection are read.

If the IP addresses, sequence number, and/or acknowledgement number do not match with the stored IDs in step 2024, this may indicate that the memory blocked may be already occupied and/or the data packet may belong to a new flow or an established flow. In step 2032, a pre-established number of bits in the 24 bit address pointer is rotated. By rotating a certain number of bits in the pointer address generates to a quasi random number. This new pointer address is now used in step 2034 to access a new memory block for the data packet with the rotated pointer address. Alternatively, in step 2036, the address pointer can be moved to next memory block to check its availability rather than rotating the pointer address.

Figure 21:
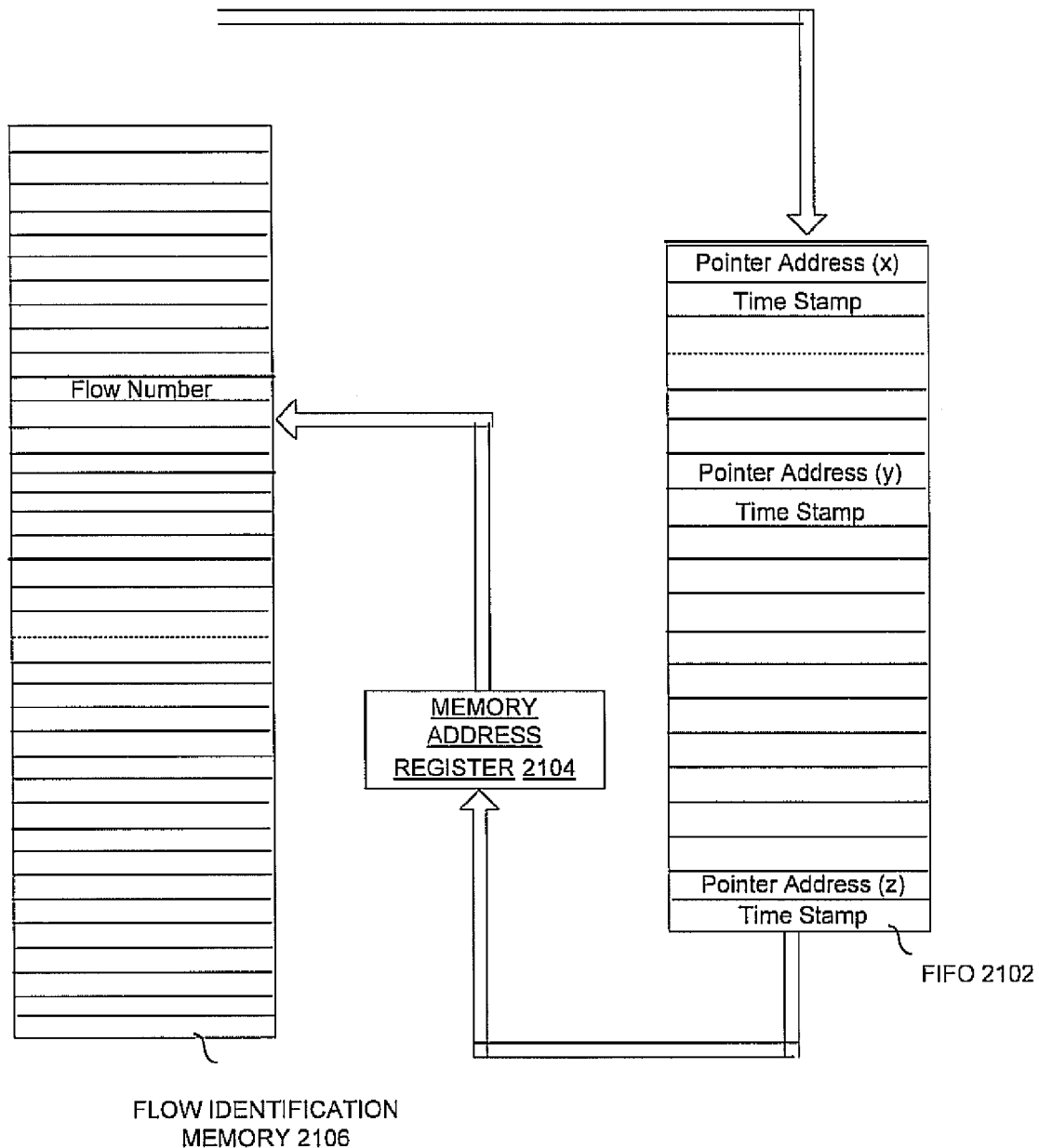
FIG. 21 is a block diagram which illustrates an exemplary process for identifying and clearing memory blocks once a transmission is completed, according to one embodiment.

FIG. 21 is a block diagram which illustrates an exemplary process for identifying and clearing memory blocks once a transmission is completed, according to one embodiment. The pointer addresses are stored along with their time stamps in a first in first out (FIFO) Memory 2102. All the pointers addresses (e.g., a pointer address (x), a pointer address (y), a pointer address (z)) are stored as a stack. After a certain number of entries into the buffer memory, the pointer address (z) is fed to a memory address register 2104. The memory address register 2104 accesses the flow identification memory 2106 using the pointer address (z) and compares the time stamp stored in that particular memory location of the flow identification memory with the time stamp of the pointer address (z). If the enough time has been elapsed and the flow number as recognized through the pointer address (z) has been dormant, then that memory location may be cleared. Subsequently, this memory location can be used for a new flow assignment.

Figure 22:
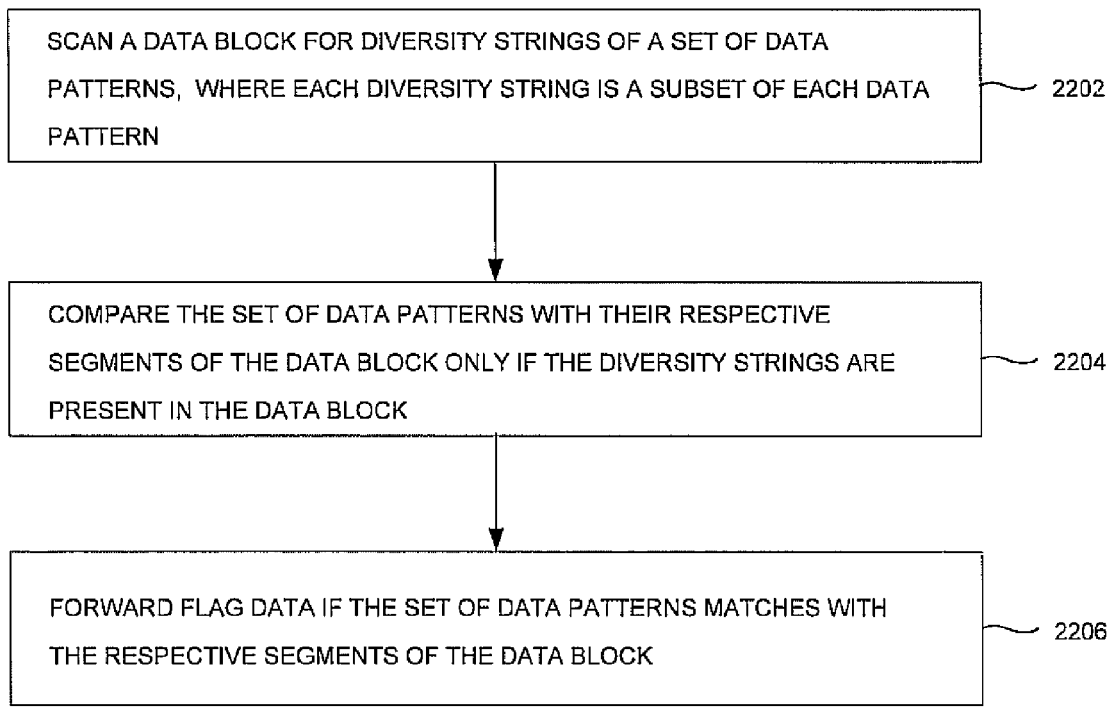
FIG. 22 is a process flow chart of an exemplary method for inspecting a set of data patterns in a data stream of multiple flows, according to one embodiment.

FIG. 22 is a process flow chart of an exemplary method for inspecting a set of data patterns in a data stream of multiple packet flows, according to one embodiment. In operation 2202, data block for respective diversity strings of the set of data patterns are scanned (e.g., at an inspection node). The data block may include multiple data packets sharing a same packet flow ID. In addition, each diversity string may be a subset of a respective one of the set of data patterns. In operation 2204, the set of data patterns are compared with their respective segments of the data block only if the diversity strings are present in the data block. In operation 2206, flag data are forwarded only if the set of data patterns matches with their respective segments of the data block. The flag data may be generated if the respective segments match the set of data patterns in the fixed sequence. The respective segments of the data block may be blocked based on the flag data.

Figure 23:
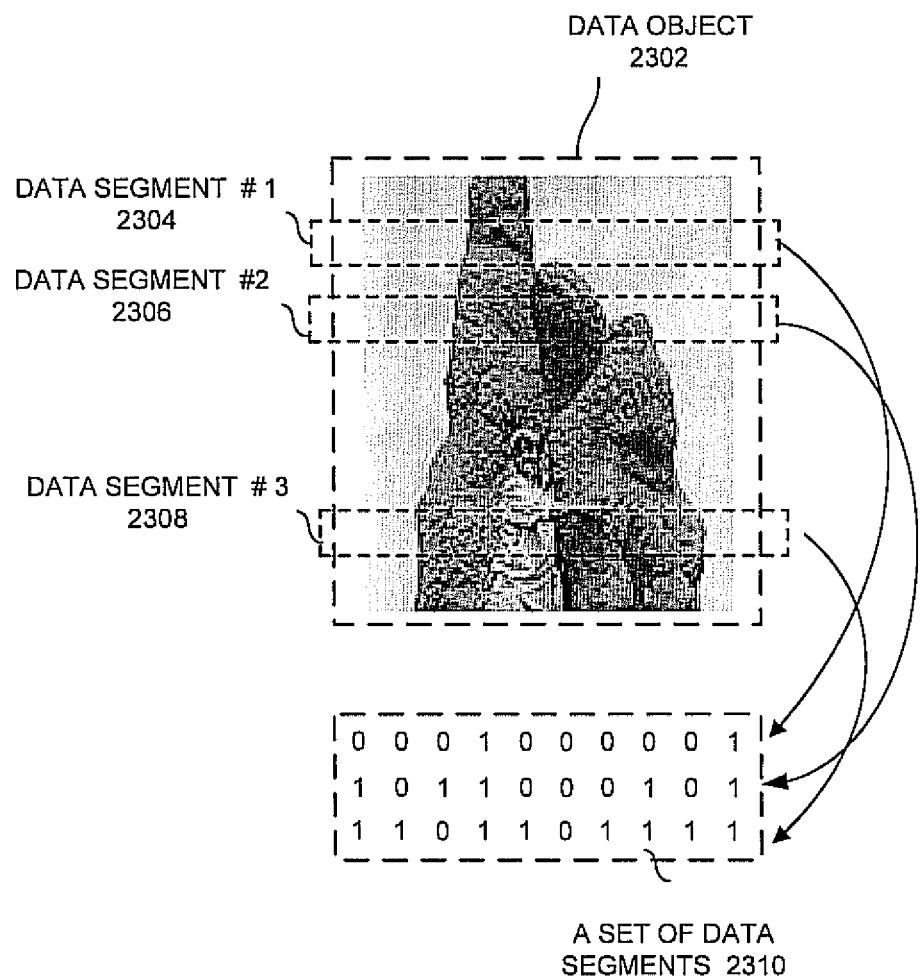
FIG. 23 illustrates an exemplary process of blocking data segments in a data object 2300, according to one embodiment.

FIG. 23 illustrates an exemplary process of blocking data segments in a data object 2300, according to one embodiment. In FIG. 23, the data object 2300 or an image may include a number of unsavory image segments that need to be blocked. Thus, the unsavory image segments, such as a data segment 2304, a data segment 2306, and a data segment 2308, can be uniquely identified through a cluster of unique signatures or patterns. As shown in the FIG. 23, the three data segments may match with unique data patterns that may be in certain categories of pictures. For example, obscene pictures may contain certain colors, textures, cavity parts, shapes, etc., that may be offensive to some viewers. These data segments together may contain certain byte patterns as in a set of data segments 2320. Since the set of data segments may form an obscene picture only if they are in a certain combination and/or order, matching of the data segments with a respective set of data patterns may need to be performed.

Figure 24:
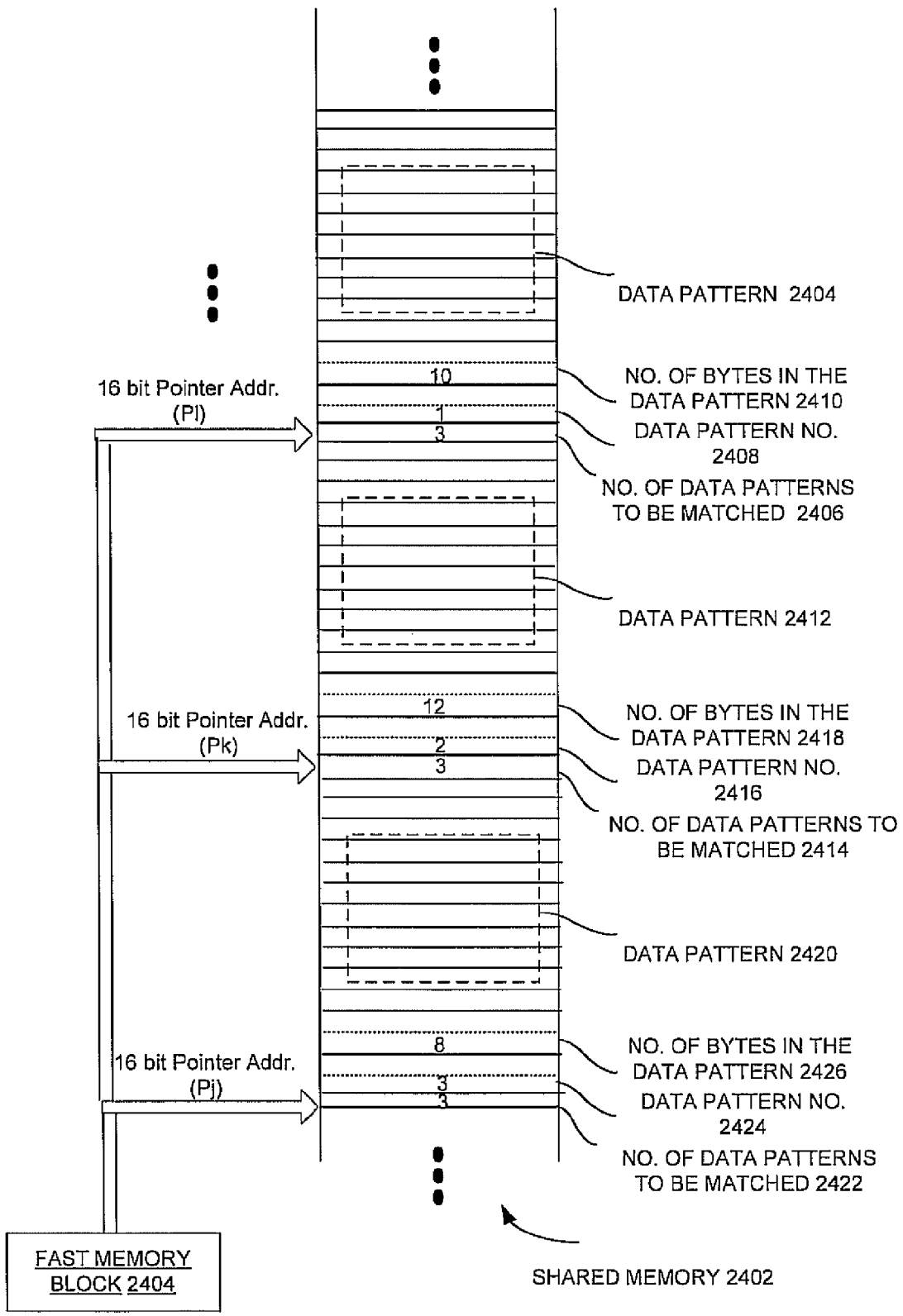
FIG. 24 illustrates an exemplary computer executable process for storing data patterns that can be matched as a set, according to one embodiment.

FIG. 24 illustrates an exemplary computer executable process for storing data patterns that can be matched as a set, according to one embodiment. In FIG. 24, a shared memory 2402 includes three data patterns or signatures pointed by three 16 pointer addresses (e.g., Pj, Pk, and Pl). For the shared memory blocks indexed by the three pointer addresses, each data pattern (e.g., a data pattern 2404, a data pattern 2412, and a data pattern 2420) includes a number of data patterns to be matched (2406, 2414, and 2422) and a data pattern no. (2408, 2416, and 2424) in the number of data patterns to be matched. In one embodiment, respective segments of a data block should match all three data patterns to generate flag data which indicates a match. In another embodiment, the segments should be in a certain sequence or order for the match to happen. It is appreciated that the group matching scheme described in FIG. 22 through FIG. 24 is based on the diversity string based pattern matching described in FIG. 1 through FIG. 15. It is also appreciated the scheme can work in the environment of multiple flows as described in FIG. 16 through FIG. 21.

Figure 25:
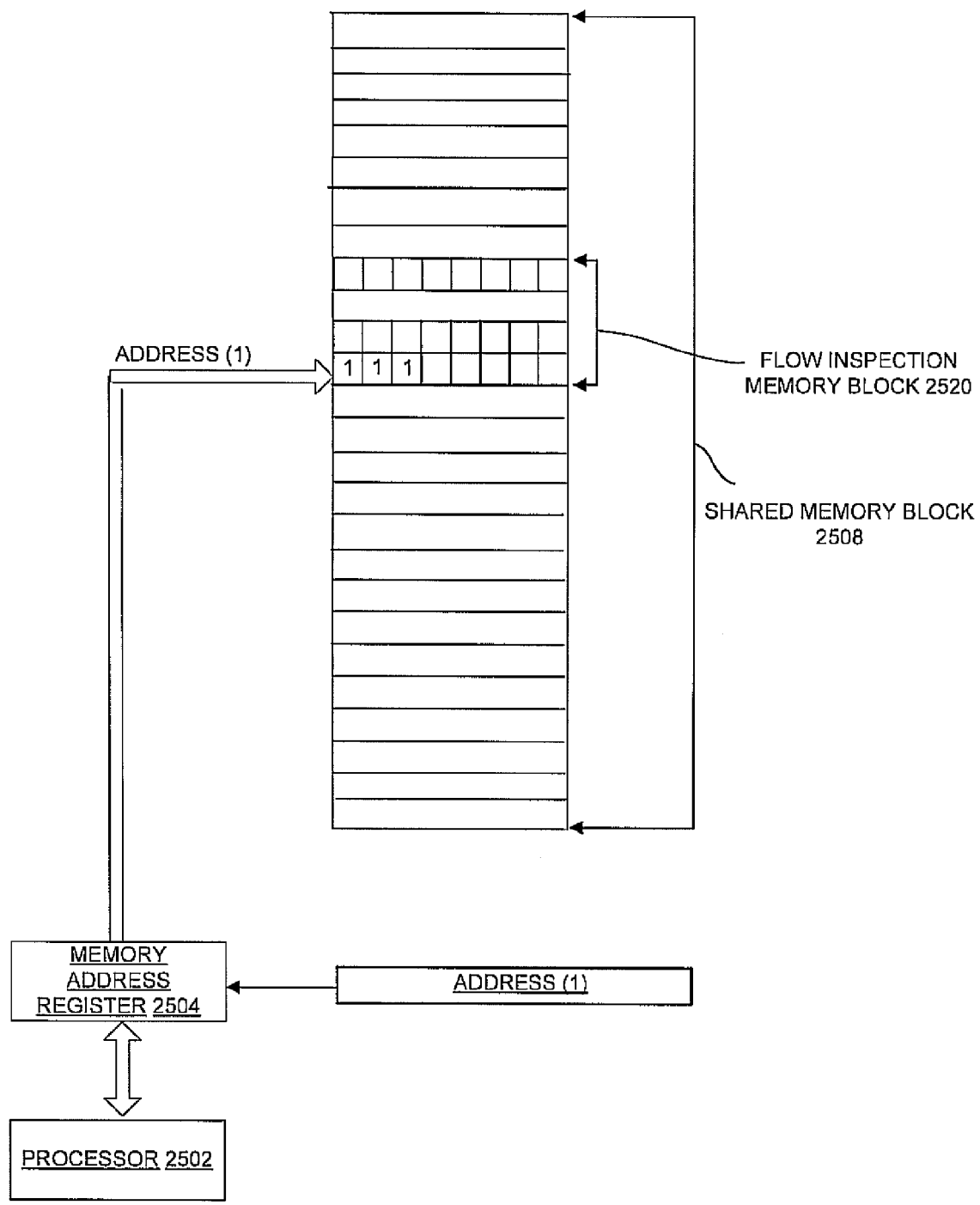
FIG. 25 illustrates a computer executable process for inspecting data packets sharing a same flow ID to a set of data patterns, according to one embodiment.

FIG. 25 illustrates a computer executable process for inspecting data packets sharing a same flow ID to a set of data patterns, according to one embodiment. In FIG. 25, using the address (e.g., address(1) of FIG. 19) where the information pertaining to the same flow ID of each packet is stored, data packets sharing the same flow ID are stored in the shared memory, and the data packets are deep packet inspected using the set of data patterns. In one embodiment, each of the set of data patterns includes a number of data patterns that need to be matched (2406, 2414, and 2422 of FIG. 24) and a data pattern number (2408, 2426, and 2424). In one exemplary implementation, the set of data patterns may be signatures or data patterns which form an obscene image in their combination.

Thus, by inspecting whether the data packets contain the set of data patterns or signatures, the offensive image can be filtered. In FIG. 25, the data packets for a particular packet flow are compared with the set of data patterns. When the data packets contain all of the set of data patterns (e.g., data pattern 1, data pattern 2, and data pattern 3 of FIG. 24) or signatures as illustrated in a flow inspection memory block 2520 of a shared memory block 2508, flag data which indicates the presence of the set of data patterns or signatures in the data packets for the same flow ID can be forwarded for further controlling of the portion of the data packets containing the set of data patterns or signatures.

In other words, FIG. 25 describes a procedure as how the matched data patterns are stored in a stateful way to determine the matching of all the individual data patterns. As illustrated in the figure, when a data pattern is matched, the corresponding bit location reflecting the data pattern is set to "1". Even when the data segments arrive out of sequences, the corresponding bits are set to 1's. The final verification of the presence of the complete set of data patterns is done by performing AND operation on the bits stored in the flow inspection memory block 2520. It is appreciated that the system has a built-in feature that even if the packets belonging to a flow arrive out of sequence, the system can still recognize the complete data patterns.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A non-transitory computer-readable medium having computer-readable program code embodied therein for causing a computer system to perform a method for comparing a plurality of data patterns to a data block, the method comprising:

scanning, using a device, the data block for a diversity string of a data pattern, wherein the data pattern is pre-defined and stored in memory resident on the computer system, wherein the diversity string is a subset of the data pattern based on at least one data byte position which best differentiates the plurality of data patterns from each other, wherein the subset is less than an entire data pattern, wherein the data block is formed by combining, using the device, a plurality of data packets sharing a same data stream flow, wherein the data stream flow comprises a numbered identifier containing a plurality of elements comprising: a least significant bit (LSB) of a source IP address, a LSB of a destination IP address, a protocol ID, a most significant byte of a sequence number, and wherein the numbered identifier allows for locating a packet in a flow;

provided the diversity string is detected within the data block, comparing the data pattern associated with the detected diversity string with a respective segment of the data block using the; and provided the data pattern matches with the respective segment of the data block, generating and forwarding flag data using the device, wherein the flag data comprises data associated with a detected match between the data pattern and the respective segment of the data block.

2. The computer-readable medium of claim 1, wherein the data block is processed at an inspection node during the inspecting of the plurality of data patterns in the data block.

3. The computer-readable medium of claim 2, further comprising blocking a flow of the respective segment of the data block via the inspection node if the flag data indicates a matching of the respective segment of the data block and the data pattern.

4. The computer-readable medium of claim 1, wherein the respective segment of the data block comprises the diversity string at same byte positions as the diversity string in the data pattern.

5. The computer-readable medium of claim 1, wherein the at least one position byte is selected by:

counting a number of different data bytes across the plurality of data patterns for each data byte position; and selecting the at least one data byte position based on the number of different bytes in the each byte position.

6. The computer-readable medium of claim 1, wherein the data pattern comprises a diffused data pattern having at least one don't care byte.

7. The computer-readable medium of claim 1, wherein the comparing the data pattern with the respective segment of the data block comprises performing an exclusive OR operation of the each of the data pattern with the segment of the data block.

8. The computer-readable medium of claim 1, wherein the diversity string is stored in a fast memory with an address pointer pointing to the data pattern.

9. The computer-readable medium of claim 1, wherein the data pattern is stored in a shared memory.

10. A computer-implemented method for inspecting a plurality of data patterns in a data stream of multiple flows, comprising:

identifying, using a device, a flow of each IP data packet using a protocol ID number, the protocol ID numbers comprising: a least significant bit (LSB) of a source IP address, a LSB of a destination IP address, a protocol ID, a most significant byte of a sequence number, and wherein the numbered identifier allows for locating a packet in a flow;

forming, using the device, a data block by combining a plurality of data packets sharing a same flow;

scanning, using the device, the data block for a diversity string of each one of the plurality of data patterns, wherein each data pattern is pre-defined and stored in memory wherein each respective diversity string is a subset of a respective data patterns and comprises at least one data byte, and wherein the subset is less than an entire data pattern;

provided the diversity string is detected within the data block, comparing the data pattern associated with the detected diversity string with a respective segment of the data block; and provided the data pattern matches with the respective segment of the data block, generating and forwarding flag data using the device, wherein the flag data comprises data associated with a detected match between the data pattern and the respective segment of the data block.

11. The computer-implemented method of claim 10, wherein the flow is determined by a flow identifier based on a combination of a source IP address, a destination IP address, a protocol ID number, and a sequence number if the data stream comprises IP packets.

12. The computer-implemented method of claim 10, wherein the forming the data block is performed using a shared memory.

13. The computer-implemented method of claim 11, wherein the flow identifier is formed using the least significant byte of the source IP address, the least significant byte of the destination address, and the most significant byte of the sequence number.

14. A computer-implemented method for inspecting a set of data patterns in a data block, comprising:

scanning with a microprocessor the data block for respective diversity strings of the set of data patterns, wherein the set of data patterns are pre-defined and stored in memory resident on the computer system, wherein each one of the diversity strings is a subset of a respective one of the set of data patterns, wherein the data block is formed by combining, using the processor, a plurality of data packets sharing a same data stream flow, wherein the data stream flow comprises a numbered identifier containing a plurality of elements comprising: a least significant bit (LSB) of a source IP address, a LSB of a destination IP address, a protocol ID, a most significant byte of a sequence number, and wherein the numbered identifier allows for locating a packet in a flow, and wherein the subset is less than an entire data pattern;

provided the diversity string is detected within the data block, comparing the set of data patterns associated with the detected diversity string with their respective segments of the data block using the processor;

provided the data pattern matches with the respective segment of the data block, generating and forwarding flap data using the processor, wherein the flag data comprises data associated with a detected match between the data pattern and the respective segment of the data block.

15. The computer-implemented method of claim 14, wherein the data block comprises a plurality of data packets in a single packet flow.

16. The computer-implemented method of claim 14, wherein the data block is processed at an inspection node during the inspecting of the plurality of data patterns in the data block.

17. The computer-implemented method of claim 16, further comprising blocking a flow of the respective segments of the data block via the inspection point if the flag data indicates a matching of the respective segments of the data block and the set of data patterns.

18. The computer-implemented method of claim 14, wherein the set of data patterns is based on a fixed sequence.

19. The computer-implemented method of claim 18, wherein the forwarding the flag data is performed only if the set of data patterns matches with their respective segments of the data block in the fixed sequence.

\* \* \* \* \*